United States Patent
Hossain et al.

(10) Patent No.: US 11,549,432 B2
(45) Date of Patent: Jan. 10, 2023

(54) INTEGRATED CHEMICAL LOOPING COMBUSTION SYSTEM AND METHOD FOR POWER GENERATION AND CARBON DIOXIDE CAPTURE

(71) Applicant: King Fahd University of Petroleum and Minerals, Dhahran (SA)

(72) Inventors: Mohammed Mozahar Hossain, Dhahran (SA); Muflih Arisa Adnan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/137,721

(22) Filed: Sep. 21, 2018

(65) Prior Publication Data

US 2020/0095898 A1 Mar. 26, 2020

(51) Int. Cl.
*F02C 3/28* (2006.01)
*F02C 6/18* (2006.01)
(Continued)

(52) U.S. Cl.
CPC .......... *F02C 3/28* (2013.01); *F02C 3/205* (2013.01); *F02C 6/18* (2013.01); *F02C 7/224* (2013.01); *F23R 3/40* (2013.01)

(58) Field of Classification Search
CPC ...... F01K 23/067; F01K 23/108; F01K 23/10; F02C 3/20; F02C 3/205; F02C 3/22; F02C 3/24; F02C 3/26; F02C 3/28; F02C 7/224
See application file for complete search history.

(56) References Cited

U.S. PATENT DOCUMENTS

| | | | | |
|---|---|---|---|---|
| 4,524,581 A | * | 6/1985 | Cascone | F02C 3/28 518/723 |
| 5,313,781 A | * | 5/1994 | Toda | C10K 1/00 60/39.12 |

(Continued)

FOREIGN PATENT DOCUMENTS

| CN | 103062910 A | 4/2013 |
|---|---|---|
| CN | 106784936 A | 5/2017 |

(Continued)

OTHER PUBLICATIONS

Spallina, et al.; Integration of coal gasification and packed bed CLC process for high efficiency and near-zero emission power generation; SciVerse ScienceDirect; Energy Procedia 37 (2013) pp. 662-670; 9 pages.

(Continued)

*Primary Examiner* — William H Rodriguez
(74) *Attorney, Agent, or Firm* — Oblon, McClelland, Maier & Neustadt, L.L.P.

(57) ABSTRACT

A chemical looping combustion (CLC) based power generation, particularly using liquid fuel, ensures substantially complete fuel combustion and provides electrical efficiency without exposing metal oxide based oxygen carrier to high temperature redox process. An integrated fuel gasification (reforming)-CLC-followed by power generation model is provided involving (i) a gasification island, (ii) CLC island, (iii) heat recovery unit, and (iv) power generation system. To improve electrical efficiency, a fraction of the gasified fuel may be directly fed, or bypass the CLC, to a combustor upstream of one or more gas turbines. This splitting approach ensures higher temperature (efficiency) in the gas turbine inlet. The inert mass ratio, air flow rate to the oxidation reactor, and pressure of the system may be tailored (Continued)

to affect the performance of the integrated CLC system and process.

20 Claims, 8 Drawing Sheets

(51) Int. Cl.
*F02C 7/224* (2006.01)
*F23R 3/40* (2006.01)
*F02C 3/20* (2006.01)

(56) References Cited

U.S. PATENT DOCUMENTS

| | | | | |
|---|---|---|---|---|
| 6,837,910 | B1* | 1/2005 | Yoshikawa | C10J 3/26 |
| | | | | 48/197 FM |
| 8,916,128 | B2 | 12/2014 | Hoteit et al. | |
| 9,109,167 | B2 | 8/2015 | Guillou et al. | |
| 9,566,546 | B2 | 2/2017 | Hoteit | |
| 9,790,437 | B2 | 10/2017 | Hoteit et al. | |
| 11,371,394 | B2* | 6/2022 | Hossain | F01K 19/02 |
| 2007/0180768 | A1* | 8/2007 | Briesch | F01K 23/10 |
| | | | | 48/197 R |
| 2008/0087022 | A1* | 4/2008 | Briesch | F01K 23/068 |
| | | | | 60/772 |
| 2012/0214106 | A1 | 8/2012 | Sit et al. | |
| 2014/0259882 | A1* | 9/2014 | Leininger | C10L 1/322 |
| | | | | 44/281 |
| 2016/0061442 | A1 | 3/2016 | Yazdanpanah et al. | |
| 2021/0003041 | A1* | 1/2021 | Hossain | F01K 13/02 |

FOREIGN PATENT DOCUMENTS

| | | |
|---|---|---|
| CN | 107208882 A | 9/2017 |
| FR | 2 960 940 | 12/2011 |
| FR | 2 997 318 | 5/2014 |

OTHER PUBLICATIONS

Kidambi, et al. ; Interaction of Iron Oxide with Alumina in a Composite Oxygen Carrier during the Production of Hydrogen by Chemical Looping ; energy&fuels ; Energy Fuels, 2012, 26 (1) pp. 603-617 ; Abstract.

Li, et al. ; CO2 Capture with Chemical Looping Combustion of Gaseous Fuels: An Overview ; energy&fuels ; Energy Fuels 2017, 31 (4), pp. 3475-3524 ; Abstract.

Nazir, et al. ; Analysis of Combined Cycle Power Plants with Chemical Looping Reforming of Natural Gas and Pre-Combustion CO2 Capture ; MDPI energies ; Jan. 8, 2018 ; 13 Pages.

Consonni, et al. ; Chemical-Looping Combustion for Combined Cycles With CO2 Capture ; Journal of Engineering for Gas Turbines and Power, vol. 128 ; Jul. 2006 ; 10 pages.

* cited by examiner

INTEGRATED CHEMICAL LOOPING COMBUSTION SYSTEM AND METHOD FOR POWER GENERATION AND CARBON DIOXIDE CAPTURE

STATEMENT OF ACKNOWLEDGEMENT

The financial support provided by King Abdul Aziz City for Science and Technology (KACST) under KACST-TIC for CCS project no. 03 and the facilities and support provided by King Fahd University of Petroleum and Minerals (KFUPM) is gratefully acknowledged.

BACKGROUND OF THE INVENTION

Field of the Invention

This application relates to chemical looping combustion (CLC) based power generation, particularly sequestering $CO_2$.

Description of the Related Art

The combustion of fossil fuel in power generation has been reported to contribute one third of the total worldwide $CO_2$ emission, believed responsible for global warming. A number of $CO_2$ sequestration technologies, both pre-combustion and post-combustion, are being developed under efforts to reduce $CO_2$ emissions. These technologies can provide substantially pure $CO_2$ separation from flue gases, though they are energy intensive, undermining the overall combustion efficiency and increase $CO_2$ capture cost.

Chemical looping combustion (CLC) potentially offers reduced/zero energy penalty for $CO_2$ separation when power is generated using fossil based fuels. CLC typically consists of a dual and interconnected fluidized bed reactor system: an oxidation reactor and a reduction reactor. An oxygen carrier (OC), which is normally an oxidized metal or mineral, is circulated between these two interconnected reactors. Various approaches to chemical looping combustion (CLC) based power generation are known in the art.

CN 106784936 A by Yan et al. discloses chemical looping combustion (CLC)-based hydrogen energy storage, combined heat and power generation and $CO_2$ capture system. Yan's CLC system has a gas turbine power generation system, an auxiliary combustion system, and a waste heat recovery/utilization system, produces hydrogen and high-temperature gas, and adsorbs and separates $CO_2$ in a combustion product. Yan's gas turbine power generation system generates power from the high-temperature gas from the CLC system or the auxiliary combustion system. Yan's auxiliary combustion system is accessed under a relatively large power load, to increase a gas temperature of a gas turbine inlet and the improve power generation efficiency. Yan's waste heat recovery/utilization system can use high, medium, and low temperature gradient waste heat resources of the system's gas, produce steam required in the system, and supply heat. Yan's system can adjust and control its power generation output ratio and hydrogen energy storage by reaction conditions while capturing $CO_2$ and supplying heat supply, and producing according to power demands.

Yan focuses on a CLC process for hydrogen energy storage and power generation using the combination of (1) a gas turbine power generation, (2) an afterburner system, and (3) a heat recovery system. Yan's system has a waste heat recovery system with an ultra-heater, evaporators, a pre-heater, heat exchangers, heaters, gas compressors, a water pump, and two gas-solid separation devices. However, Yan's system does not include a gasification subsystem to form syngas or a gas splitter feeding gasified fuel directly to a combustor prior to any turbines, particularly without any intervening reactive or separative components.

U.S. Pat. No. 9,790,437 B2 to Hoteit at al. discloses a process for power generation using a chemical looping combustion concept is integrated with heavy liquid fuel coking in a cracking reactor, and is configured such that petcoke deposits on metal oxide particles from the cracking reactor are used as fuel in the chemical looping combustion reaction. Hoteit '437's process is also configured such that metal oxide particles provide the heat necessary for the cracking reaction to be initiated in the cracking reactor. Hoteit '437's CLC system can have three main reaction zones: a first reaction zone defined by a cracking reactor; a second reaction zone defined by a fuel reactor; and a third reaction zone defined by an air reactor. Hoteit '437's fuel reactor can be operatively connected to both the cracking reactor and the air reactor.

However, Hoteit '437 requires a cracking reactor and a fuel reactor to generate syngas, rather than using a gasifier to generate syngas. Also, Hoteit '437's syngas does not appear to be oxidized to form a $CO_2/H_2O$ stream. Hoteit '437 focuses instead on using heavy liquid fuels to produce heat and electricity with an integrated CLC and cracking technique. Hoteit '437's reduction (second) reactor can gasify the petcoke deposited in the oxygen carrier from heavy liquid fuels cracking (first reactor) into syngas (e.g., CO and $H_2$) with the help of steam and $CO_2$. Hoteit '437's "splitter" reactors are not configured to feed gasified fuel directly to a combustor, e.g., prior to any turbines and/or without any intervening reactive or separative components. Instead, these "splitter" reactors are configured to circulate the metal oxides particles and thereby maintain the pressure balance between the main reactors. One of Hoteit '437's splitting reactors maintains the pressure drop of its system by controlling the circulation of the metal oxide particles between the fuel reactor and the cracking reactor, whereby, after exiting Hoteit '437's splitting reactor, the reduced metal oxide particles can then be circulated back to the fuel reactor and/or the cracking reactor. Hoteit '437's other "splitter" reactor receives oxidized metal oxides and maintains the pressure between the air reactor and the fuel reactor by metal oxide circulation control, whereby, upon exiting this splitter reactor, the oxidized metal oxide particles are recirculated to the fuel reactor bottom and/or back to the air reactor to complete the oxidation of the reduced metal oxides if not complete.

U.S. Pat. No. 9,109,167 B2 to Guillou et al. discloses a process for treating bituminous feedstocks wherein the energy required to separate the organic and mineral fractions of the bituminous feedstocks in a treatment unit powered by hot water is provided by chemical looping combustion (CLC). Guillou's plant comprises: a chemical loop with an oxidation reaction zone, supplied with air, and a reduction reaction zone; a heat exchange zone located in an exchanger inside, on the wall of, and/or added to, a combustion enclosure, and/or an exchanger arranged inside, on the wall of, and/or added to, an oxidation enclosure, and/or an exchanger on fume lines and/or on metallic oxide transfer lines; a treatment unit for separating the mineral component and the organic component the bituminous feedstock operating in the presence of water and soda, between 80° C. and 90° C., the water being heated in zone, with a line for extracting a bitumen fraction from the treatment unit; and a line for sending the bitumen fraction as fuel to the reduction reaction zone. The oxidation of the oxygen carrier occurs after the reduction of the oxygen carrier in the reduction reaction zone. Combustion takes place in the presence of the fuel and the oxygen present in the oxidized oxygen carrier. A heat flux for heating Guillou's water stream carried by a water stream line in the heat exchange zone is produced by heat exchanger(s).

However, Guillou's system lacks a power generation subsystem and is furthermore silent on a gas splitter in its system. In Guillou, the fuel is supplied into the reduction reactor, also called a "fuel" reactor therein, and a gaseous product stream from the reduction reactor, consisting mainly of $H_2O$ and $CO_2$, is sent to a gasification reactor. Guillou also appears to require a direct connection between its (oxidation) air reactor and its ("fuel") reduction reactor, if not also in the reverse direction, optionally only having an intervening solid-solid separator. In Guillou's gasification reactor, a separate fuel stream is injected to be converted into syngas. Guillou's does not disclose further processing its syngas-generated in a fluidized bed gasification reactor downstream of its oxidation-reduction loop. Guillou's system does not gasify fuel in a gasifier and the syngas is fed to a reduction reactor.

U.S. Pat. No. 9,566,546 B2 to Hoteit discloses a chemical looping combustion (CLC) process for sour gas combustion with a number of reaction zones and configured to provide in-situ oxygen production and in-situ removal of $SO_2$ from a product gas stream by reacting the $SO_2$ with a calcium-based sorbent at a location within one reaction zone. Hoteit '546's CLC process is also configured such that the in-situ oxygen production results from the use of a metal oxide oxygen carrier which is purposely located such that it does not directly contact the sour gas, thereby eliminating the generation of undesirable sulfur-based metal oxides. Hoteit '546's method reduces a bed of metal oxide oxygen carriers disposed on a perforated substrate in a lower portion of a fuel reactor to give gas-phase oxygen which flows to a riser in fluid communication with the fuel reactor; delivers sour gas into the riser at a location downstream of the metal oxide oxygen carriers such that the sour gas is free of direct contact with the metal oxide oxygen carriers; combusts the sour gas under oxy-combustion conditions within the riser to produce the product stream including $SO_2$; removes the $SO_2$ from the product stream by reacting the $SO_2$ with a calcium-based sorbent introduced into the riser to form $CaSO_4$; oxidizes the reduced metal oxide with air in an air reactor to produce the metal oxide oxygen carriers; and delivers the oxidized metal oxide oxygen carriers back to the fuel reactor.

While Hoteit '546 uses two gas-solid separation devices, it does not use a splitter feeding to a combustion. Hoteit '546's gas-solid separation devices are not configured to feed gasified fuel directly to a combustor, e.g., prior to any turbines and/or without any intervening reactive or separative components, but appears to send its product gas of $CO_2$, $H_2O$, and $SO_2$, as well as a small amount of CO and $H_2$, either to an environment or to a Ca-based sorbent. Hoheit suggests using a metal oxide such as copper, manganese, and/or cobalt-based oxides, to manage its sour gases, but indicates that any other metal oxide or the like suitable for CLC would be acceptable, and these metal oxides can be supported on Al or Si. At least Hoteit '546's sour products teach away from using a turbine to generate power, beyond Hoteit '546's silence on using a gas splitter. In addition, Hoteit '546 is silent on gasification and fails to produce syngas, beyond trace byproducts, in its arrangement.

Spallina et al.'s Energy Procedia 2013, 37, 662-670, discloses a chemical looping combustion through packed beds using solid hydrocarbons as fuel for power production with $CO_2$ capture. Spallina tests the technical, economic, and environmental feasibility for implementing packed bed based high temperature and high pressure chemical looping combustion in large-scale power plants, presenting preliminary results of a process simulation study of Integrated Gasification Chemical Looping Combustion (IG-CLC) plants, based on packed bed CLC reactors. Spallina predicts performance of complete IG-CLC power plants, including the coal gasification system, the CLC process and the power island in two configurations. First, a gas-steam combined cycle is used, where the high temperature $O_2$-depleted stream produced by a pressurized air reactor is expanded in a gas turbine. Second, power is generated by an advanced super critical steam cycle. Spallina indicates that electric efficiencies 2.5% higher than the competitive IGCC plant with $CO_2$ capture by physical absorption and more than 97% of $CO_2$ avoided.

While Spallina discloses a dry-feed gasifier for coal which is fed with a 95% $O_2$ stream, Spallina's system feeds its gasification products directly to syngas coolers and acid gas removal elements, but does not "split" the gasified stream in the sense of feeding a portion, e.g., 50% of the stream to a combustor and another 50% to a reduction reactor, rather than separating out, e.g., acidic gases from the "unsplit" stream. Spallina's system thus does not include a gas splitter.

Kidambi et all's Energy Fuels 2012, 26(1), 603-617, discloses solid solutions of hematite ($\alpha$-$Fe_2O_3$) and corundum ($\alpha$-$Al_2O_3$) have been synthesized by coprecipitation. The resulting particles have been used as oxygen carriers for the production of hydrogen by chemical looping and characterized using X-ray diffraction (XRD), temperature programmed reduction (TPR), specific surface area measurements (BET), scanning electron microscopy (SEM), and energy dispersive X-ray spectroscopy (EDXS). The particles were repeatedly (i) reduced with, e.g., CO to, nominally, Fe, (ii) then oxidized with steam to $Fe_3O_4$ to produce hydrogen, (iii) then returned to $Fe_2O_3$ by oxidizing with air. The optimum loading of $Al_2O_3$ in the composite particles was found to be 25 wt. % for the production of hydrogen over 50 cycles, resulting in an average yield (mole $H_2$ formed/ theoretical amount possible on reduction to Fe and oxidation to $Fe_3O_4$) of hydrogen of ~48%. Kidambi found that although $Al_2O_3$ is often thought of as inert, it participates in the oxidation and reduction reactions by forming $FeAl_2O_4$ and various solid solutions with the iron oxides. Kidambi explains this behavior with phase diagrams and discusses the applicability of these particles for the production of hydrogen by chemical looping.

However, Kidambi's system does not include a power generation subsystem, i.e., for generating power, in its system. In addition, Kidambi does not discuss gasification in its configuration.

Li et al.'s Energy Fuels 2017, 31(4), 3475-3524, discloses a chemical looping combustion (CLC) review focused on CLC of gaseous fuel, e.g., natural gas (NG), combustion including types of oxygen carriers (OCs), reactor types, coke formation and OCs poisoning, efficiency and exergy analyses, and model development based on a literature survey. Li indicates that the plant efficiency of NG-CLC can be up to 52 to 60% (LHV), including $CO_2$ compression, based on calculations and simulations, which is about 3 to 5% more efficient than a NG combined cycle with $CO_2$ capture. Li indicates that Ni-based materials have been widely developed and applied for NG-CLC because of its fast kinetics for methane conversion. Li indicates that CuO—$Cu_2O$/Cu, $Mn_3O_4$—MnO, and $Fe_2O_3$—$Fe_3O_4$ are typical OCs with high selectivity toward $CO_2$ and $H_2O$. The operating conditions are closely dependent on reactor configurations, hydrodynamics, mass and heat balances, and characteristics of the OCs in the system. Li also compares CLC and other $CO_2$ capture technologies from simulation and process analysis and conducts a conceptual design of a NG-CLC power plant of thermal input 655 $MW_{th}$ to clarify its technological advantages and economic benefits compared to other power generation processes. Li concludes that the air reactor, fuel reactor, and OCs do not impose significant economic barriers for scale-up and commercialization of CLC.

However, Li's system, among other things, does not include a gasification or power generation unit including a syngas splitter.

Nazir et al.'s *Energies* 2018, 11, 147, analyzes a gas-fired combined cycle power plant subjected to a pre-combustion $CO_2$ capture method under different design conditions and different heat integration options. Nazir's power plant configuration includes the chemical looping reforming (CLR) of natural gas (NG), water gas shift (WGS) process, $CO_2$ capture and compression, and a hydrogen fueled combined cycle to produce power. Nazir's process is denoted as a CLR-CC process. Nazir indicates that one of the main parameters that affects the performance of the process is the pressure for the CLR. Nazir's process is analyzed at different design pressures for the CLR, i.e., 5, 10, 15, 18, 25 and 30 bar, and observes that the net electrical efficiency increases with an increase in the design pressure in the CLR. Secondly, Nazir indicates that the type of steam generated from the cooling of process streams also effects the net electrical efficiency of the process. Nazir states that out of the five different cases including the base case presented in this study, it is observed that the net electrical efficiency of CLR-CCs can be improved to 46.5% (lower heating value of NG basis) by producing high-pressure steam through heat recovery from the pre-combustion process streams and sending it to the Heat Recovery Steam Generator in the power plant.

However, while Nazir discloses a heat recovery system and $CO_2$ capture, Nazir's system likewise fails to include a gasification including a syngas splitter.

Consonni et al.'s *J. of Engineering for Gas Turbines and Power* 2006, 128, 525-534, discloses a chemical-looping combustion (CLC) is a process where fuel oxidation is carried out through an intermediate agent—a metal oxide—circulated across two fluidized bed reactors: a reduction reactor, where an endothermic reaction reduces the metal oxide and oxidizes the fuel, and an oxidation reactor, where an exothermic reaction oxidizes the metal oxide in air. Overall, Consonni's system carries out the same job of a conventional combustor, with the fundamental advantage of segregating the oxidation products, $CO_2$ and $H_2O$ into an output flow free of nitrogen and excess oxygen. The flow exiting the reduction reactor consists of water and $CO_2$, the latter readily available for liquefaction, transport and long-term storage. The hot, vitiated air from the oxidation reactor is the means to produce power through a thermodynamic cycle. Consonni assesses the potential of the integration between CLC and combined gas-steam power cycles. Consonni focuses on four issues: (i) optimization of plant configuration; (ii) prediction of overall efficiency; (iii) use of commercial gas turbines; and (iv) preliminary economic estimates. Consonni's CLC system is based on iron oxides which, to maintain their physical characteristics, must operate below 900 to 1000° C. Consonni teaches a crucial importance of the temperature of the vitiated air generated by CLC on the performance of the combined cycle, and considers two options: (i) "unfired" systems, where natural gas is fed only to the CLC system; (ii) "fired" systems, where the vitiated air is supplementary fired to reach gas turbine inlet temperatures ranging 1000 to 1200° C. Consonni indicates that unfired configurations with maximum process temperature 850 to 1050° C. and zero emissions reach net LHV plant efficiencies ranging 43% to 48%. Fired cycles where temperature is raised from 850 to 1200° C. by supplementary firing can achieve 52% net LHV efficiency with $CO_2$ emission about one half of those of a state-of-the-art combined cycles. Consonni states that fired configurations allow significant capital cost and fuel cost savings compared to unfired configurations, but that a carbon tax high enough to make them attractive (close to 50 €/ton) would undermine these advantages.

While Consonni describes feeding natural gas to a reduction reactor and the use of a hematite ($Fe_2O_3$)-magnetite ($Fe_3O_4$) oxygen carrier system, Consonni fails to show a splitter in its system which divides off the gasification product to at least two reaction stations. Instead, Consonni's system has a division of natural gas in its "fired" scheme—part going to the reduction reactor and part going to a supplemental firing—or a division of its reduction reactor products to its oxidation reactor and its cyclone.

CN 103062910 A by Xiang discloses a method and a device for integrating chemical-looping combustion with $CO_2$ trapping. Xiang's method includes generating water gas after coal is gasified by steam and oxygen in a gasification reactor, and filling it into a chemical-looping combustion fuel reactor via an air distributor, reducing NiO into Ni by the water gas, to give gaseous products including $CO_2$ and $H_2O$. Xiang's Ni is fed into an air reactor via a return feeder, and is oxidized into NiO by air, heat is released simultaneously, and the NiO is fed back into the fuel reactor via a return feeder. Coke generated after the coal is gasified is fed into a calcination reactor via a return feeder. The coke and $O_2$ are combusted completely to generate $CO_2$, and a large quantity of heat is released. $CaCO_3$ is heated and is decomposed into CaO and $CO_2$, and the pure $CO_2$ can be acquired at an outlet of the calcination reactor. The CaO is fed into a carbonation reactor and absorbs low-concentration $CO_2$ in flue gas to generate a product of $CaCO_3$, accordingly trapping the $CO_2$.

Xiang's coal-based gasification reactor produces syngas as a main component, but leads this product through its air distribution plate into the reactor fuel in its CLC. While Xiang's system divides off coke into its calciner, and its gasification reactor is fed with air and NiO through its air reactor, Xiang's system does not suggest a splitter which would divide a gasification product stream, e.g., syngas, off directly into two different stages.

CN 107208882 A by Hoteit discloses an improved chemical looping combustion (CLC) process and system including a hopper containing oxygen carrier particles, e.g., metal oxides, that are gravity fed at a controlled rate of flow from the hopper into (a) a generally vertical downflow reactor where the particles are mixed with the hydrocarbon fuel feed to the system and (b) into one or more standpipes in communication with a plurality of staged fluidized reactor beds. The amount of the oxygen carrier particles introduced into Hoteit's system is stoichiometrically predetermined to produce a syngas mixture of $H_2$ and $CO_2$, or to complete combustion of the fuel to $CO_2$ and water vapor, thereby permitting capture of a majority of the $CO_2$ produced in an essentially pure form.

Among other things, Hoteit's system contains two fuel reactors, but does not split the product stream into two or more streams directly towards separate stages.

FR 2 960 940 A1 by Gautier et al. discloses a combustion process of a solid filler chemical looping circulating an oxygen carrier material. Gautier's method comprises: contacting the solid filler particles in the presence of particles of metal oxides in a first reaction zone operating in the bubbling fluidized bed; combusting waste gas from the first reaction zone in the presence of metal oxide particles in a second reaction zone; separating unburned particles and metal oxide particles of the gas in a mixture from the second region in a separation zone; and reoxidizing the oxide particles metal in an oxidation zone before returning to the first zone.

Gautier's system produces syngas and contains two gas-solid separators, a chamber containing a fluidized bed allowing separation more thrust of the light particles (ash) from the remaining unburned particles which are then recycled towards the reaction zone, and a separation zone immediately downstream of its second reaction zone. Gautier's separation zone is not a splitter, i.e., it does not divide a syngas stream to two different stages, but instead conveys Gautier's gaseous stream containing the lighter particles—mostly unburned particles and optionally fly ash—and a minor fraction of particulate carriers of oxygen to Gautier's two-stage gas-solid separation cyclones, allowing recovery of the particles in the gas flow line and recycling to the reaction zone.

FR 2 997 318 A1 by Sozinho et al. discloses a redox active material in the form of particles comprising a natural ore pyrolusite type manganese initially comprising at least 60 wt % of $MnO_2$, with a mass enriched with nickel oxide. Sozinho also discloses a combustion process of solid hydrocarbon feeds, liquid or gaseous redox chemical looping using such a redox active material, advantageously applied to $CO_2$ capture. In a first reaction zone operating in a dense fluidized bed, the hydrocarbon feeds are brought into contact with the particles of the oxido-reducing active mass. In a second reaction zone, the gaseous effluents from the first reaction zone are combusted in the presence of the particles of the oxido-reducing active mass. In a first division zone operating in a fluidized bed, the particle stream of the active mass coming from the second reaction zone is divided into a first sub-flow going back into the second reaction zone and a second sub-flow going to an oxidation zone. The active mass particles are reoxidized in the oxidation zone before being returned to the zone. In a second division zone operating in a fluidized bed, the active mass particle flow coming from the oxidation zone is divided into a third sub-flow going back into an oxidation zone and a fourth sub-flow going to the first reaction zone.

Sozinho's system, like Gautier's, produces syngas and has two gas-solid separators, a chamber containing a fluidized bed, and a separation zone immediately downstream of its second reaction zone. Like Gautier's system, however, nowhere in Sozhinho's system is a splitter, and its separation zone does not contain a splitter.

U.S. Pat. No. 8,916,128 B2 to Hoteit et al. discloses an energetically self-sufficient syngas production method in at least one chemical loop. Hoteit '128's chemical loop involves at least three distinct oxidation, reduction, and gasification reaction zones: (1) an air-supplied oxidation reaction zone R1, e.g., an "air" reactor, where the oxidation of the metallic oxides takes place after reduction; (2) a combustion reduction reaction zone, e.g., a "fuel" reactor, where the feed combustion takes place in the presence of the oxygen present in the metallic oxides; and (3) a gasification reaction zone, e.g., a "gasification" reactor, for gasification of the solid and/or liquid feeds to produce a syngas. The gasification is catalyzed by at least partly reduced metallic oxides from (2)

Hoteit '128's system describes a gasification of a liquid or solid residue carried out in a "gasification" reactor, wherein the residue is upgraded to syngas $CO/H_2$ under the conditions (temperature, pressure, number of moles of water per male of fuel) required for gasification and in the presence of reduced materials $MeO_{1-x}$ having catalytic properties. Hoteit '128 describes sending products of its gasification reaction zone to a Fischer-Tropsch stage, to a fuel cell to produce electricity and/or heat, or to a water gas shift reaction stage, and its syngas product can be split to a WGS and a fuel cell in an embodiment. In addition, Hoteit '128's system separates off solids from the gasification to a separator. However, Hoteit '128 does not suggest dividing a syngas stream from gasification with a splitter to a separate reduction reactor and a combustion. Moreover, Hoteit '128's oxidation reactor is separated from its reducer by the gasifier, rather than one or both operating upstream of the gasifier.

US 2012/0214106 A1 by Sit et al. discloses a chemical looping combustion process for producing heat and/or steam from a hydrocarbon fuel. A metal oxide oxygen carrier is reduced from an initial oxidation state in a first reduction reaction with a hydrocarbon fuel to provide $CO_2$, $H_2O$, heat, and a reduced metal or metal oxide having a first reduced state, the first reduced state being lower than the initial oxidation state, and then the reduced metal or metal oxide from the first reduced state is further reduced in a second reduction reaction with additional hydrocarbon fuel to provide $CO_2$, $H_2O$, heat, and a further reduced metal or metal oxide having a second reduced state, the second reduced state being lower than the first reduced state. The further reduced metal or metal oxide is oxidized, substantially back to the initial oxidation state with air to produce $N_2$, $O_2$, and heat.

Sit's system describes generating syngas ($H_2$ and CO) from light or heaving fuels, but does not describe a splitter to divide a gasification stream to two different stages, instead focusing on dividing and varying injection points of fuel and air combinations to tailor the ratios of $H_2$ to CO in its syngas. Sit also describes dividing its synthesis gas produced by its fuel reactor for injection in up to four different locations to optimize the reduction of its oxygen carrier, but does not suggest feeding a portion of its gasification product to a combustion stage and another portion, e.g., to a reducer.

US 2016/0061442 A1 by Yazdanpanah et al. discloses method for chemical looping (CLC) oxidation-reduction combustion of liquid hydrocarbon feedstocks carried out in a fluidized bed, wherein liquid hydrocarbon feedstock is partly vaporized on contact with a hot solid of particles to form a partly vaporized liquid feedstock and to form coke on the solid, prior to contacting partly vaporized liquid feedstock with a redox active mass in form of particles so as to achieve combustion of partly vaporized liquid feed. Hot solid particles used to carry the coke can form a second fluidized-bed particle circulation loop, the first loop being of the oxygen-carrying redox active mass circulating between the oxidation and combustion reactors, thus allowing recycling coke-carrying particles to the process.

Yazdanpanah describes three reaction zones, as well as producing syngas, and feeding the gasification product to a separation zone, but Yazdanpanah's separation zone is not a splitter which divides the syngas stream to two different stages. Instead, Yazdanpanah suggests directly feeding its syngas to the separator, which separates off the solids and recycles a stream to the first reaction zone and sends a different composition product stream to an oxidation reaction zone.

Accordingly, there is a need for alternate approaches to CLC plant design and energy efficiency in layout and methodology.

SUMMARY OF THE INVENTION

An aspect of the invention provides an integrated system, comprising: a gasification subsystem comprising (a-i) a fuel heater suitable for heating a liquid fuel stream, (a-ii) a gasifier located downstream of, and fluidly connected to, the fuel heater, the gasifier being configured to gasify the liquid fuel stream with an oxygen-rich stream to form a syngas stream, and (a-iii) a gas splitter located downstream of, and fluidly connected to, the gasifier, the gas splitter being configured to split the syngas stream into a first syngas substream and a second syngas substream; a chemical looping combustion (CLC) subsystem comprising (b-i) a reducer located downstream of, and fluidly connected to, the gas splitter, the reducer being configured to oxidize the first syngas substream in the presence of an oxygen carrier to form a $CO_2/H_2O$ stream, the oxygen carrier being reduced to a reduced oxygen carrier, and (b-ii) an oxidizer located downstream of, and fluidly connected to, the first solid-gas separator, the oxidizer being configured to oxidize the reduced oxygen carrier in the presence of an oxygen-containing stream to regenerate the oxygen carrier; a power generation subsystem comprising (c-i) a combustor located downstream of, and fluidly connected to, the gas splitter and the oxidizer, the combustor combusting the second syngas substream in the presence of the oxygen-containing stream to form an exhaust stream, and (c-ii) a first gas turbine located downstream of, and fluidly connected to, the combustor for generating gas turbine shaft work with the exhaust stream; a heat recovery-steam generation (HRSG) subsystem comprising (d-i) a first heat exchanger located downstream of, and fluidly connected to, the reducer, the first heat exchanger being configured to form steam by heating a water stream with the $CO_2/H_2O$ stream.

The CLC subsystem may further comprise (b-iii) a first solid-gas separator located downstream of, and fluidly connected to, the reducer, the first solid-gas separator being configured to separate the $CO_2/H_2O$ stream from the reduced oxygen carrier, wherein the first heat exchanger is located downstream of, and fluidly connected to, the first solid-gas separator.

The CLC subsystem may further comprise (b-iv) a second solid-gas separator located downstream of, and fluidly connected to, the oxidizer, the second solid-gas separator being configured to separate the oxygen-containing stream from the oxygen carrier, wherein the combustor is located downstream of, and fluidly connected to, the second solid-gas separator.

The power generation subsystem may further comprise (c-iii) a first steam turbine located downstream of, and fluidly connected to, the first heat exchanger, wherein the first steam turbine is configured to generate steam turbine shaft work with the steam.

The HRSG subsystem may further comprise (d-ii) a second heat exchanger located downstream of, and fluidly connected to, the reducer and the first heat exchanger, wherein the second heat exchanger is configured to form steam at no higher temperature than the first heat exchanger by heating a water stream with the $CO_2/H_2O$ stream.

The power generation subsystem may further comprise (c-iv) a second steam turbine located downstream of, and fluidly connected to, the second heat exchanger, wherein the second steam turbine operates at no higher pressure than the first steam turbine, and wherein the second steam turbine is configured to generate steam turbine shaft work with the steam.

The HRSG subsystem may further comprise (d-iii) a third heat exchanger located downstream of, and fluidly connected to, the reducer and the first and second heat exchangers, wherein the third heat exchanger is configured to form steam at no higher temperature than the second heat exchanger by heating a water stream with the $CO_2/H_2O$ stream.

The power generation subsystem may further comprise (c-v) a third steam turbine located downstream of, and fluidly connected to, the third heat exchanger, wherein the third steam turbine operates at no higher pressure than the second steam turbine, and wherein the third steam turbine is configured to generate steam turbine shaft work with the steam.

The heat exchangers and/or steam turbines the may arranged in series.

Systems within the scope of the invention may further comprise: a condenser located downstream of, and fluidly connected to, the first heat exchanger, the condenser condensing the $CO_2/H_2O$ stream to form a condensate and a $CO_2$ stream; and/or a gas compressor located downstream of, and fluidly connected to, the condenser, the gas compressor being configured to compress the $CO_2$ stream, wherein $CO_2$ is present in the $CO_2$ stream at a volume concentration of at least 75 vol % relative to the total volume of the $CO_2$ stream.

Systems within the scope of the invention may further comprise: two or more condensers located downstream of, and fluidly connected to, the first heat exchanger, the condensers condensing the $CO_2/H_2O$ stream to form a condensate and a $CO_2$ stream; and a gas compressor located downstream of, and fluidly connected to, each of the condensers, wherein the gas compressors are configured to compress the $CO_2$ stream, wherein $CO_2$ is present in the $CO_2$ stream at a volume concentration of at least 75 vol. % relative to the total volume of the $CO_2$ stream.

The oxygen carrier(s) may comprises iron oxide, nickel oxide, manganese oxide, copper oxide, or a mixture of two more of any of these, and/or the oxygen carrier may be supported on a substantially inert material comprising alumina, silica, silicates, (non-reactive) zeolites, sepiolite, titanium oxide, zirconium oxide, and similar substantially inert materials, or a mixture of two or more of any of these, particularly an aluminum and/or silicon oxide or a mixture of two or more of any of these. The oxygen carrier may comprise iron (III) oxide supported on alumina, optionally with a mass ratio of the alumina to the oxygen carrier in a range of from 0.25 to 0.75.

Inventive systems may be configured such that a molar ratio of the second syngas substream to the syngas stream is in a range of from 0.001 to 0.25.

The fuel heater may be further suitable for heating and delivering a solid fuel stream to the gasification.

Inventive systems may further comprise one or more water-gas shift reactor stage downstream of the gas splitter, and/or a pressure swing absorber, optionally before the oxidizer, particularly in a loop with the compressor. The system may preferably avoid directing any gasification products to a shift reactor.

An aspect of the invention provides a method of generating power, optionally using the integrated system of claim 1. The method may comprise: delivering a hydrocarbon fuel-particularly a heavy liquid-stream to a fuel heater to form a heated fuel stream; delivering the heated fuel stream to a gasifier to form a syngas stream in the presence of an oxygen-rich stream; splitting the syngas stream to a first syngas substrate and a second syngas substrate with a gas splitter, and delivering the first syngas substrate to a reducer while concurrently delivering the second syngas stream to a combustor; oxidizing the first syngas stream with the reducer in the presence of an oxygen carrier to form a $CO_2/H_2O$ stream, wherein the oxygen carrier is reduced to a reduced oxygen carrier; optionally separating the $CO_2/H_2O$ stream from the reduced oxygen carrier with a first solid-gas separator, before delivering the reduced oxygen carrier to an oxidizer; oxidizing the reduced oxygen carrier with the oxidizer in the presence of the oxygen-containing stream to regenerate the oxygen carrier; optionally separating the oxygen-containing stream from the oxygen carrier with the second solid-gas separator, before delivering the oxygen carrier to the oxidizer while concurrently delivering the oxygen-containing stream to the combustor; combusting the second syngas stream in the presence of the oxygen-containing stream to form an exhaust stream; and delivering the exhaust stream to a gas turbine to generate power.

The method may use as oxygen carrier iron (III) oxide supported on alumina, or any of the others mentioned herein, and the carrier material may have a mass ratio of alumina to the oxygen carrier in a range of from 0.25 to 0.75. A molar ratio of the second syngas substrate to the syngas stream may be 0.01 to 0.25.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
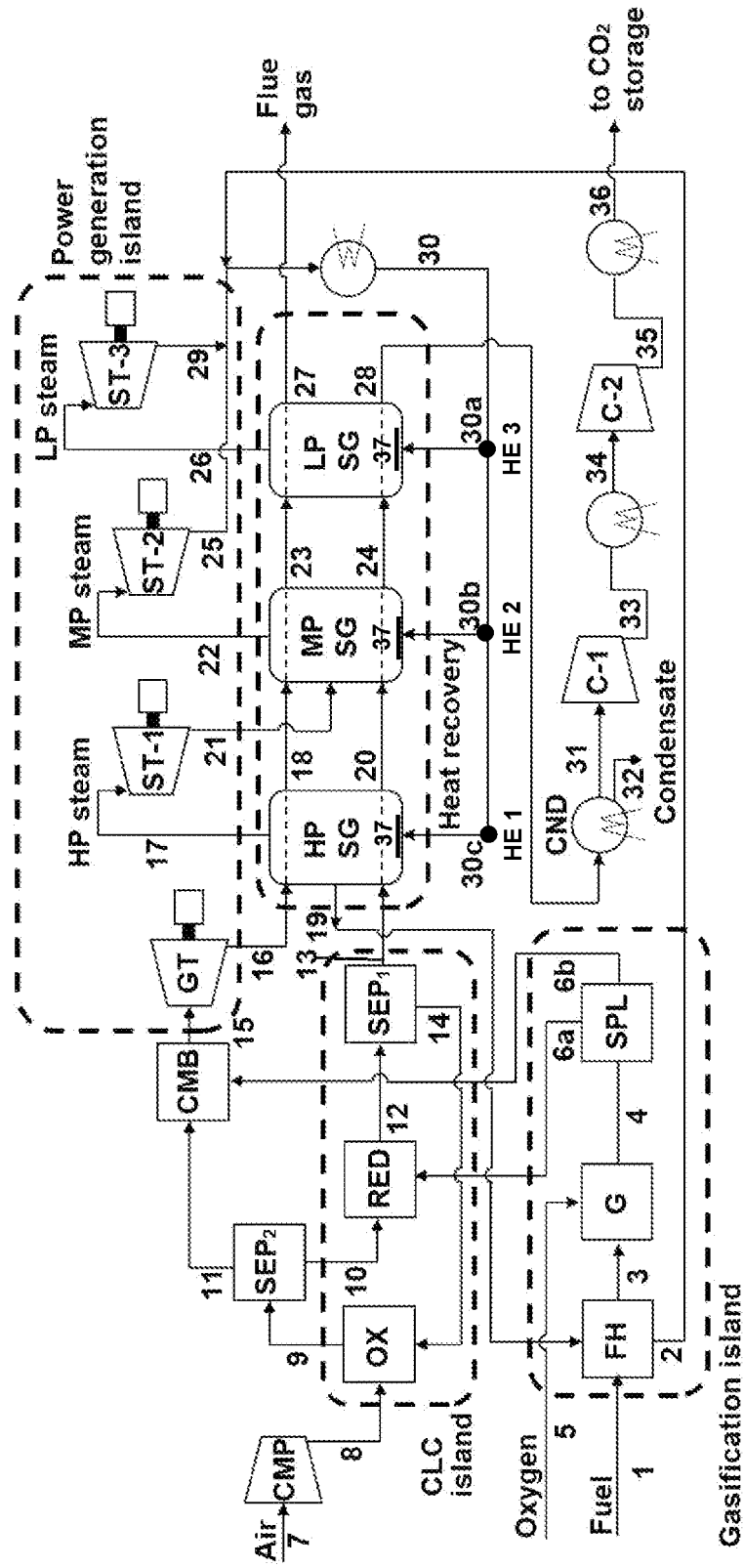
FIG. 1 shows a schematic plant layout and process flow diagram of a combined chemical looping process within the scope of the present invention.

Aspects of the invention provide integrated systems, comprising a gasification subsystem, a chemical looping combustion (CLC) subsystem, a power generation subsystem, and a heat recovery-steam generation (HRSG) subsystem, and particularly comprising a gas splitter located downstream of, and fluidly connected to, a gasifier, which gas splitter is configured to split the syngas stream (primarily $H_2$ and CO) from the gasifier into a first syngas substream and a second syngas substream, wherein one or both of these substreams are (directly) sent to separate stages in the CLC process. The first substream may be sent to a reducer/reduction reactor, while the second substream is fed directly to a combustor/combustion reactor, one or preferably both, prior to any turbines, particularly without any intervening reactive or separative components between the splitter and the reducer and/or combustor. The splitter may be configured to separate out particular components of the gasification product, i.e., syngas, stream, but preferably, the splitter merely divides the gasification product stream.

Inventive gasification subsystems may comprise (a-i) one or more fuel heaters, (a-ii) one or more gasifiers, and/or (a-iii) one or more gas splitters, generally connected in series.

Useful fuel heaters within the scope of the invention are preferably configured to handle, i.e., suitable for heating, a liquid fuel stream. Such liquid fuels may include any petroleum or mineral oils, oil sands, oil shales, crude oils, tars, tar sands, sour oils, asphalts, waxes, tallows, napthas, lubricating oils, and the like, but may also include lighter fuels, such as petroleum ethers, gasoline, gas oils, aromatics, paraffins, naphthenes, kerosenes, fuel oils, diesels, or the like. Useful fuel heaters may alternatively, or additionally to liquids, be configured to heat and deliver solid fuels, including, for example, coal, lignite, petroleum coke, polyaromatic hydrocarbons (PACs), and the like. Useful fuel heaters may alternatively, or additionally to liquids and/or solids, be configured to heat and deliver gases, such as methane, natural gas, propane, butane(s), C1-C4 gases, liquefied petroleum gas, or the like.

Within the scope of the invention, gasifiers are generally located downstream of, and fluidly connected to, the fuel heater, as well as the gas splitter. Useful gasifiers are generally configured to gasify the liquid fuel stream with an oxygen-rich stream to form a syngas stream, though the gasification may be conducted on solid or gaseous sources, or even on any combination of these. The gasification preferably occurs with less than 10, 5, 2.5, 1, 0.5, 0.1, 0.001 wt. % metal oxide particles, or even in the absence of metal oxide particles, though exclusion metal oxide particles is not necessary for useful results.

Gas splitters useful within the invention are generally located downstream of, and fluidly connected to, the gasifier, alongside being further downstream of any fuel heater(s). The gas splitter should be suitable to split, i.e., divide, the syngas stream from the gasification reactor(s) into at least a first syngas substream and a second syngas substream. These substreams are preferably of substantially the same composition relative to one another, though the compositions are not required to be identical and it is possible to remove undesired components from, or enrich desired components, of one or both of the substreams. Gas splitters useful in the invention are distinct from gas-solid separators, or other stream component separators conventional in the art, and instead function to divide a stream volumetrically, i.e., as a percent of the full composition stream, such as 5 vol. % of a full composition syngas stream into one substream and 95 vol. % of a full composition syngas stream into a second substream. Useful splitting or split ratios may be in a range of 0 to 25, 2.5 to 20, 5 to 17.5, or 7.5 to 15 mol. % to, e.g., the substream headed to the combustor, and a remainder to the other substream. Further useful upper endpoints for the substream to the combustor could be 50 mol. %, 40, 33.3, 30, 27.5, 22.5, 16.6, 12.5, 10, 7.5, 5, or 2.5 mol. %, based on the moles of gas from the gasification subsystem or "island," while further useful lower endpoints for the substream to the combustor could be 0.1, 0.25, 0.5, 1, 2, 3, 4, 6, 10, 12.5, or 15 mol. %.

In addition to the gasification subsystem in any arrangement discussed above, a chemical looping combustion (CLC) subsystem within the scope of the invention may comprise (b-i) at least one reducer/reduction reactor located downstream of, and fluidly connected to, the gas splitter, the reducer being configured to oxidize the first syngas substream in the presence of an oxygen carrier to form a $CO_2/H_2O$ stream, the oxygen carrier being reduced to a reduced oxygen carrier, (b-ii) optionally, at least one first solid-gas separator located downstream of, and fluidly connected to, the reducer, the first solid-gas separator being configured to separate the $CO_2/H_2O$ stream from the reduced oxygen carrier, (b-iii) at least one oxidizer/oxidation reactor located downstream of, and fluidly connected to, the first solid-gas separator, the oxidizer being configured to oxidize the reduced oxygen carrier in the presence of an oxygen-containing stream to regenerate the oxygen carrier, and (b-iv) optionally, at least one second solid-gas separator located downstream of, and fluidly connected to, the oxidizer, the second solid-gas separator being configured to separate the oxygen-containing stream from the oxygen carrier.

Feeding the CLC subsystem will generally be air, which is usually fed into the oxidizer via one or more compressors. In addition to this, the air fed into the oxidizer is preferably enriched in oxygen ($O_2$) concentration, i.e., at least 80, 85, 90, 92.5, 95, 97.5, 99, or 99.9 wt. % $O_2$. The air and/or oxygen stream may even be substantially pure oxygen, i.e., having triple or double digit ppm amounts of contaminants or less. The air may be preprocessed in a pressure swing adsorption unit to modify the gas composition, though purified gases are also commercially available.

Useful oxygen carriers herein could be any oxidized metal(s) or mineral(s) which can be circulated between generally two (or more) interconnected reactors or reactor spaces. The oxygen carrier(s) may comprise iron oxide, nickel oxide, manganese oxide, copper oxide, cobalt oxide, mineral(s) such as ilmenite, or a mixture of two more of any of these, which may include multi-metal oxides (such as bimetallic oxides) or mixtures of single-metal oxides. In addition, the oxygen carrier may supported on a substantially inert material comprising an alumina, silica, silicates, (non-reactive) zeolites, sepiolite, titanium oxide, zirconium oxide, and similar substantially inert materials, or mixture of two or more of any of these. Preferred supports may include aluminum and/or silicon oxides, which may include multi-metal oxides or mixtures of single-metal oxides, particularly alumina. Exemplary oxygen carriers could be $Fe_2O_3$—$Fe_3O_4$, CuO, Co—Ni. The oxygen carrier may preferably comprise iron (III) oxide, preferably supported on alumina. The mass ratio of the support to the oxygen carrier, in such an arrangement, may preferably be a range of from 0.25 to 0.75, 0.3 to 0.7, 0.35 to 0.65, 0.4 to 0.6, or 0.45. The molar ratio of the second syngas substream to the syngas stream—streaming from the gasification—is in a range of from 0.01 to 0.25, 0.025 to 0.2, 0.033 to 0.175, 0.05 to 0.15, 0.067 to 0.133, or 0.075 to 0.125.

The oxygen carrier in its oxide form should be suitable to provide oxygen needed for the combustion of fuel in the reduction reactor(s) and produce reduced metal (oxide), steam, and $CO_2$. The oxygen carrier-assisted reaction typically follows Equation 1, below:

$$(2j+k)M_xO_y + C_jH_{2k} \rightarrow (2j+k)M_xO_{y-1} + kH_2O + jCO_2 \quad \text{(Eq. 1)},$$

which is a modified form of the idealized gasification reaction following Equation 2, below;

$$C_xH_y + x/2 O_2 \leftrightarrow xCO + y/2 H_2 \quad \text{(Eq. 2)},$$

augmented by an idealized oxidation of the oxygen carrier following Equation 3, below:

$$M_xO_{y-1} + \tfrac{1}{2}O_2 \rightarrow M_xO_y \quad \text{(Eq. 3)}$$

Reduction schemes for an exemplary oxygen carrier are as set forth in Equations 4 and 5, along with enthalpic balances, below:

$$3Fe_2O_3 + CO \leftrightarrow CO_2 + 2Fe_3O_4 \;\; \Delta H_{298}^0 = -871 \text{ MJ/kmol} \quad \text{(Eq. 4)}$$

$$3Fe_2O_3 + H_2 \leftrightarrow H_2O + 2Fe_3O_4 \;\; \Delta H_{298}^0 = -830 \text{ MJ/kmol} \quad \text{(Eq. 5)}$$

and the oxidation reaction, with enthalpic balance is in Equation 6, as follows:

$$4Fe_3O_4 + O_2 \leftrightarrow 6\,Fe_2O_3 \;\; \Delta H_{298}^0 = -943 \text{ MJ/kmol} \quad \text{(Eq. 6)}.$$

In addition to the gasification and/or CLC subsystem in any arrangement discussed above, a power generation subsystem within the scope of the invention may comprise (c-i) at least one combustor located downstream of, and fluidly connected to, the gas splitter and the oxidizer, the combustor combusting the second syngas substream in the presence of the oxygen-containing stream to form an exhaust stream, (c-ii) at least a first gas turbine located downstream of, and fluidly connected to, the combustor for generating gas turbine shaft work with the exhaust stream, (c-iii) optionally, a first, second, and/or third steam turbine located downstream of, and fluidly connected to, the first heat exchanger, the first steam turbine being configured to generate steam turbine shaft work with the steam.

The second steam turbine may be located downstream of, and fluidly connected to, the second heat exchanger. The second steam turbine may operate at the same or a lower pressure than the first steam turbine. The second steam turbine may be configured to generate steam turbine shaft work with the steam.

The third steam turbine may be located downstream of, and fluidly connected to, the third heat exchanger. The third steam turbine may operate at the same or a lower pressure than the second steam turbine. The third steam turbine may be configured to generate steam turbine shaft work with the steam.

The steam turbines may be arranged in series, though there may be dual (or additional) steam turbines arranged in parallel, and there may be a mixture of series and parallel steam turbines, or all steam turbines may be in parallel or in series.

In addition to the gasification, CLC, and/or power generation subsystem in any arrangement discussed above, a heat recovery-steam generation (HRSG) subsystem within the scope of the invention may comprise (d-i) a first heat exchanger located downstream of, and fluidly connected to, the reducer, the first heat exchanger being configured to form steam by heating a water stream with the $CO_2/H_2O$ stream, (d-ii) optionally, a second heat exchanger located downstream of, and fluidly connected to, the reducer and the first heat exchanger, the second heat exchanger being configured to form steam at no higher temperature than the first heat exchanger by heating a water stream with the $CO_2/H_2O$ stream, and (d-iii) optionally, a third heat exchanger located downstream of, and fluidly connected to, the reducer and the first and second heat exchangers, the third heat exchanger being configured to form steam at no higher temperature than the second heat exchanger by heating a water stream with the $CO_2/H_2O$ stream.

The heat exchangers may be arranged in series, though there may be dual (or additional) heat exchangers arranged in parallel, and there may be a mixture of series and parallel heat exchangers, or all heat exchangers may be in parallel or in series.

Integrated systems, i.e., plant arrangements, according to the invention may further comprise one or more condensers located downstream of, and fluidly connected to, the first, second, third, and/or further heat exchangers, the condensers being configured to condense the $CO_2/H_2O$ stream to form a condensate and a $CO_2$ stream. The integrated systems may further comprise one or more gas compressors located downstream of, and fluidly connected to, the one or more condensers. These gas compressors are generally configured to compress the $CO_2$ stream, while the $CO_2$ is present in the $CO_2$ stream(s) at a volume concentration of at least 75, 80, 85, 90, 95, 96, 97, 97.5, 98, 99, 99.5, or 99 vol. % relative to the total volume of the $CO_2$ stream. The $CO_2$ may be captured according to any method known, including those disclosed by Yan, each Hoteit reference, Guillou, Spallina, Li, Nazir, Xiang, Consonni, which are incorporated by reference herein.

In addition to, or separate from the above, systems within the invention may further comprise one or more water-gas shift reactor stage downstream of the gas splitter and gasifier. Systems within the invention may further comprise one or more pressure swing absorbers, i.e., prior to the air compressor upstream of the oxidizer, or after the gasification, depending upon the contents of the gases in question.

Aspects of the invention provide method of generating power, optionally using an integrated system according to any combination of the features described herein. Inventive methods will generally involve a splitting of the gasification product, i.e., syngas, into at least two similar or identically composed syngas substreams. Methods within the invention will generally comprise: delivering a hydrocarbon fuel—particularly liquid hydrocarbon—stream to a fuel heater to form a heated fuel stream; delivering the heated fuel stream to a gasifier to form a syngas stream in the presence of an oxygen-rich stream; splitting the syngas stream to a first syngas substream and a second syngas substream with a gas splitter, and delivering the first syngas substream to a reducer while concurrently delivering the second syngas stream to a combustor; oxidizing the first syngas stream with the reducer in the presence of an oxygen carrier to form a $CO_2/H_2O$ stream, wherein the oxygen carrier is reduced to a reduced oxygen carrier; optionally separating the $CO_2/H_2O$ stream from the reduced oxygen carrier with a first solid-gas separator, before delivering the reduced oxygen carrier to an oxidizer; oxidizing the reduced oxygen carrier with the oxidizer in the presence of the oxygen-containing stream to regenerate the oxygen carrier; optionally separating the oxygen-containing stream from the oxygen carrier with the second solid-gas separator, before delivering the oxygen carrier to the oxidizer while concurrently delivering the oxygen-containing stream to the combustor; combusting the second syngas stream in the presence of the oxygen-containing stream to form an exhaust stream; and delivering the exhaust stream to a gas turbine to generate power.

An important aspect of integrated CLCs within the scope of the invention is electricity production. Thus, performance of plants and process according to the invention can be measured in terms of net electrical efficiency. The net electrical efficiency is the ratio of the total energy produced by the power generation system to sum of the energy in the fuel oil and the energy required for any oxygen purification of the air fed into the oxidizer. Producing one ton of 95% purity $O_2$ from air requires 305 kW. The energy balance for the system modelled herein is in Equation 7 below:

$$\eta_e = \frac{E_e - (E_{oxy} + E_{C1} + E_{C2} + E_{C3} + E_{Aux})}{m_{fuel} \cdot LHV_{fuel}}, \quad \text{(Eq. 7)}$$

wherein $\eta_e$ is the net electrical efficiency, $E_e$ is the total energy produced by the power generation system, $m_{fuel}$ is the mass flow rate of the fuel oil, and $LHV_{fuel}$ is the low heating value of the fuel oil. $E_{oxy}$ and $E_{aux}$ respectively represent the energy consumed for oxygen production and auxiliaries, while $E_{C1}$, $E_{C2}$, and $E_{C3}$ are the energy consumed for air compressor (CMP), $CO_2$ compressor $1^{st}$ stage (C-1), and $CO_2$ compressor $2^{nd}$ stage (C-2), respectively. According to this calculation, higher net electrical efficiency indicates better performance of a combined CLC process as modelled. Similar calculus may be applied to augmented plant designs with fewer or more stages.

A further relevant facet of performance evaluation may be $CO_2$ emissions relative to the producer gas directly fed into the combustion (CMB) and released to the atmosphere after heat recovery. The specific $CO_2$ emission is defined as the amount of $CO_2$ emitted to the atmosphere per the amount of the energy produced from the power generation system. Equation 8, below, sets forth the evaluation of specific $CO_2$ emission as follows:

$$EM_{CO2} = \frac{m_{CO2}}{E_e}, \quad \text{(Eq. 8)}$$

wherein $EM_{CO2}$ is the specific $CO_2$ emission and $m_{CO2}$ is the amount of $CO_2$ emitted to the atmosphere, Fe again being the total energy produced by the power generation system.

The experiment in this application (Example) can be compared for accuracy with the data set forth in Consonni (Comp. Ex), which discussed in the Background section. The comparative data is set forth in Table 1, below.

TABLE 1

| Components | OX products | | RED products | |
|---|---|---|---|---|
| | Comp. Ex. | Example | Comp. Ex. | Example |
| Solids | | | | |
| Mass flow, kg/s | 2507 | 2507 | 2470 | 2470 |
| Temperature, ° C. | 1050 | 999 | 986.2 | 997 |
| Reduced iron, % wt | 0 | | 43.6% | 43.9% |
| Oxidized iron, % wt | 50.8% | 50.7% | 6.5% | 6.1% |
| Inert material, % wt | 49.2% | 49.3% | 50.0% | 50.0% |
| Gases | | | | |
| Mass flow, kg/s | 474.8 | 437.7 | 47.2 | 47.4 |
| Temperature, ° C. | 1050 | 999 | 986.2 | 997 |
| $N_2$, % mol | 82.70% | 84.99% | 1.09% | 1.07% |
| $O_2$, % mol | 15.18% | 15.01% | 0.00% | 0.00% |
| Ar, % mol | 0.98% | 0.00% | 0.00% | 0.00% |
| $H_2O$, % mol | 1.11% | 0.00% | 65.25% | 65.17% |
| $CO_2$, % mol | 0.03% | 0.00% | 33.64% | 33.75% |

TABLE 1-continued

| Items | Comp. Ex. | Example |
|---|---|---|
| Power output, MW | | |
| Gas turbine | 111.1 | 118.7 |
| Steam turbine | 98.6 | 48.7 |
| $CO_2$ compressor, MW | −4.8 | −5.2 |
| Auxiliaries | −3.3 | −2.5 |
| Net power output | 201.6 | 159.8 |
| Natural gas fuel input, $MW_{LHV}$ | 467.1 | 467.1 |
| Net efficiency | 43.2% | 34.2% |

Certain parameters have been determined to influence the results of the process or plant operation, including the actual to stoichiometric ratio of air supply (AS ratio), the mass ratio of the inert material (e.g., $Al_2O_3$) to the mass of the oxygen carrier (e.g., $Fe_3O_4$), the reaction pressure, and the producer gas split ratio (SP ratio) representing moles producer gas, i.e., syngas, directly flowing to the combustor (CMB) for per mole of producer gas from the gasification. These parameters are discussed below in relation to the drawings.

Referring now to the drawings, wherein like reference numerals designate identical or corresponding parts throughout the several views.

In reference to FIG. 1, an embodiment of the integrated CLC process comprises four main units/groups: (i) a gasification island, (ii) chemical looping combustion island, (iii) heat recovery and (iv) power generation system. In this example, fuel oil, referred to as a liquid fuel stream (1) may be heated in the fuel heater (FH) prior to the gasifier (G) and then the heated fuel oil (3) is sent to the gasifier. Further sources of carbon, e.g., methane, natural gas, light hydrocarbons, coal, tar(s), or the like may be used. The analysis report of the fuel oil is given in Table 2. In other stream, the oxygen with 95% purity, referred to as an oxygen-rich stream (5) is also fed to the gasifier (G) from the air purification process. In the presence of the oxygen as a gasifying agent, the fuel oil may be converted into gaseous products, such as $H_2$, CO, $CO_2$, and $CH_4$, and some amount of coke.

TABLE 2

| Parameter | Value |
|---|---|
| Mass fraction | |
| Carbon | 86.6 |
| Hydrogen | 13.7 |
| Nitrogen | <0.1 |
| Sulfur | 0.05 |
| Lower heating value, MJ/kg | 43.00 |

The coke formed during gasification is preferably homogenously fluidized along with the gaseous products. The gasifier products, referred to as a syngas stream (4) are then directed to the gas splitter (SPL) to divide the gasifier into two streams: a stream to the reduction reactor (RED) (6a), referred to as a first syngas substream, and a stream to the combustor (CMB) (6b) referred to as a second syngas substream. A useful function, optionally the main function, of the combustor (CMB) is to enhance the temperature of the flue gas prior to the gas turbine (GT). In the combustor (CMB), the gasifier products, including CO and $H_2$, and optionally further gas(es), react with the excess oxygen from the oxidation reactor (OX).

In the oxidation reactor (OX), the oxygen, which may be present as a component of the air (8) referred to as an oxygen-containing stream, reacts with the magnetite ($Fe_3O_4$) from the reduction reactor (RED), and produces the hematite ($Fe_2O_3$) as the oxygen carrier. Air in the oxidation reactor (OX) may be supplied from the atmosphere using compressor (CMP) (7). Practically, the oxygen carrier is hosted or supported on a support, such as alumina ($Al_2O_3$), silica ($SiO_2$), zeolite, glass, or some other at least substantially inert material.

The products from the oxidation reactor (OX) (9), referred to as the oxygen carrier, i.e., in this example, hematite on alumina, excess oxygen, and nitrogen, are then circulated to the second gas-solid separator ($SEP_2$) to separate the solid product (10), i.e., hematite in this example, and the gaseous products (11) i.e., $O_2$ and $N_2$. The hematite can flow to the reduction reactor (RED) while the gaseous products may be directed to the CMB to combust with the second syngas substream (6b) to form an exhaust stream (15) in the gas turbine (GT) to generate mechanical work. The mechanical work may be further converted to the electricity by generating gas turbine shaft work with the exhaust stream.

The flue gas from the gas turbine (GT) (16) may flow to the atmosphere or cycle back through the steam generation system (30), i.e., high pressure (HP) (30c), medium pressure (MP) (30b), and low pressure (LP) (30a) steam generators (SG), with each of which one or more steam turbines (ST-1, ST-2, ST-3) may be associated. Exhaust from the GT outlet (16) enters a high pressure steam generator (HP SG) where the exhaust gets converted to HP steam (17) or moves to the medium pressure steam generator (MP SG) (18), which then gets converted to medium pressure steam (22) or moves to the low pressure steam generator (LP SG) (23), which can then get converted into low pressure steam (26) or may flow to the atmosphere (27) or cycle back through the steam generation system (30). The HP (17), MP (22), and LP (26) steam each enter the ST-1, ST-2, and ST-3 respectively, generating power. The exhaust from ST-1 (21), ST-2 (25), and ST-3 (29) cycles back through the steam generation system (30) at the high (30c), medium (30b), or low (30a) pressures through at least one heat exchanger (HE). In the reduction reactor (RED), the gasifier products from the gas splitter (SPL) (6a) may react with the hematite, and yield $CO_2$, $H_2O$ and magnetite ($Fe_3O_4$). The products from the reduction reactor (RED) (12) may be sent to the cyclone (CYC) referred to as the first solid gas separator ($SEP_1$) to separate the gaseous products (13), i.e., $CO_2$ and $H_2O$ referred to as the $CO_2/H_2O$ stream, from the solid product (14), referred to as the reduced oxygen carrier, i.e., magnetite ($Fe_3O_4$) in this case. The magnetite may be sent to the oxidation reactor (RED) for regeneration while the gaseous products are sent to the steam generation system. The gaseous products from the RED (13) enters the series of steam generators each containing a water stream, where in the HP SG it heats the water stream (37) to make HP steam (17) or moves to the MP SG (20), where the water stream gets converted to medium pressure steam (22) or moves to the LP SG (24), where the water stream gets converted into low pressure steam (26) or the gaseous products from the RED are then cooled eventually stored as $CO_2$ (28).

From the steam generation system the gaseous products are then cooled to 30° C. (28) and the condensed water is separated in the condenser (CND) (32). The dry gaseous products (31) are then compressed using two stages intercooler gas compressor (C-1 (33) and C-2 (34, 35)) to 85 bar before storage (36). The gaseous products from the reduction reactor (RED) (13) contain high purity of $CO_2$ (96-98%). Therefore, in this integrated CLC process, the $CO_2$ is stored as a valuable product instead of being emitted to the atmosphere. It is worth noticing that the gasification reaction occurs in the gasifier (G), while both the oxidation reaction and reduction reactions involved in the oxidation reactor (OX) and reduction reactor (RED), respectively.

An integrated CLC process as depicted in FIG. 1 is modeled with the Gibbs minimization approach using ASPEN PLUS® software. In ASPEN PLUS® software, carbon, hematite, magnetite and alumina are treated as solid compounds. The fuel oil and the gaseous products are considered respectively as the nonconventional and mixed component using the MIXCINC® stream class. The Peng-Robinson thermodynamic package is used for physical properties in the simulations presented in the drawings. The Peng-Robinson Equation of State (EOS) is considered suitable for predicting hydrocarbons and light gases, e.g., $N_2$, CO, $H_2$, etc., as well as their mixtures. The following four assumptions were made to simplify the model. First, $N_2$ and alumina were treated as inert materials. Second, the effect of pressure drop, mass transfer, and thermo-fluid-dynamic were treated as negligible. Third, the reactors, i.e., the gasifier (G, in the drawings), the oxidation reactor (OX, in the drawings), the reduction reactor (RED, in the drawings) and the combustor (CMB) were treated as run at equilibrium. Fourth, an adiabatic system and single properties of the fuel were used. Table 3 presents the operating conditions of the combined CLC process in FIG. 1 as modelled.

TABLE 3

| Air supply | 25° C., 1 atm |
|---|---|
| Fuel oil supply | 25° C., 10 atm |
| Oxygen supply | 25° C., 10 atm |
| Compressor air leakage | 0.8% of inlet flow rate |
| Compressor polytropic efficiency | 90% |
| Turbine isentropic efficiency | 93% |
| Approach temperature | 25° C. |
| Steam generation pressure level | 1.8 bar, 18.4 bar, 78.2 bar |
| Condensor pressure | 0.05 bar |
| Generator efficiency | 99% |
| $CO_2$ compressor isentropic efficiency | 85% |
| $CO_2$ compressor mechanical efficiency | 96% |
| $CO_2$ compressor electrical efficiency | 96% |
| $CO_2$ storage | 30° C., 85 bar |

The thermodynamic modelling of gasification can be conducted using Gibbs minimization approach. A heated fuel oil with the mass flow rate of 50,000 kg/h from the fuel heater (FH) is fed to the gasifier (G). Suitable mass flow rates, can for example, be in the range of 1,000,000 to 60, 500,000 to 600, 250,000 to 6,000, 125,000 to 10,000, 100,000 to 15,000, or 75,000 to 20,000 kg/h. The heated fuel oil is converted into gaseous products in the gasifier (G). As modelled herein, the $R_{Yield}$ and the $R_{Gibbs}$ reactors are used to simulate the gasifier since the fuel oil is considered nonconventional and requires conversion into its constituent element in the $R_{Yield}$ prior to the $R_{Gibbs}$ reactor. In the $R_{Gibbs}$ reactor, i.e., the modelled gasifier (G), the fuel oil reacts with the oxygen, and it produces the gaseous products, sometimes called producer gas, primarily comprising $H_2$ and CO.

Figure 2:
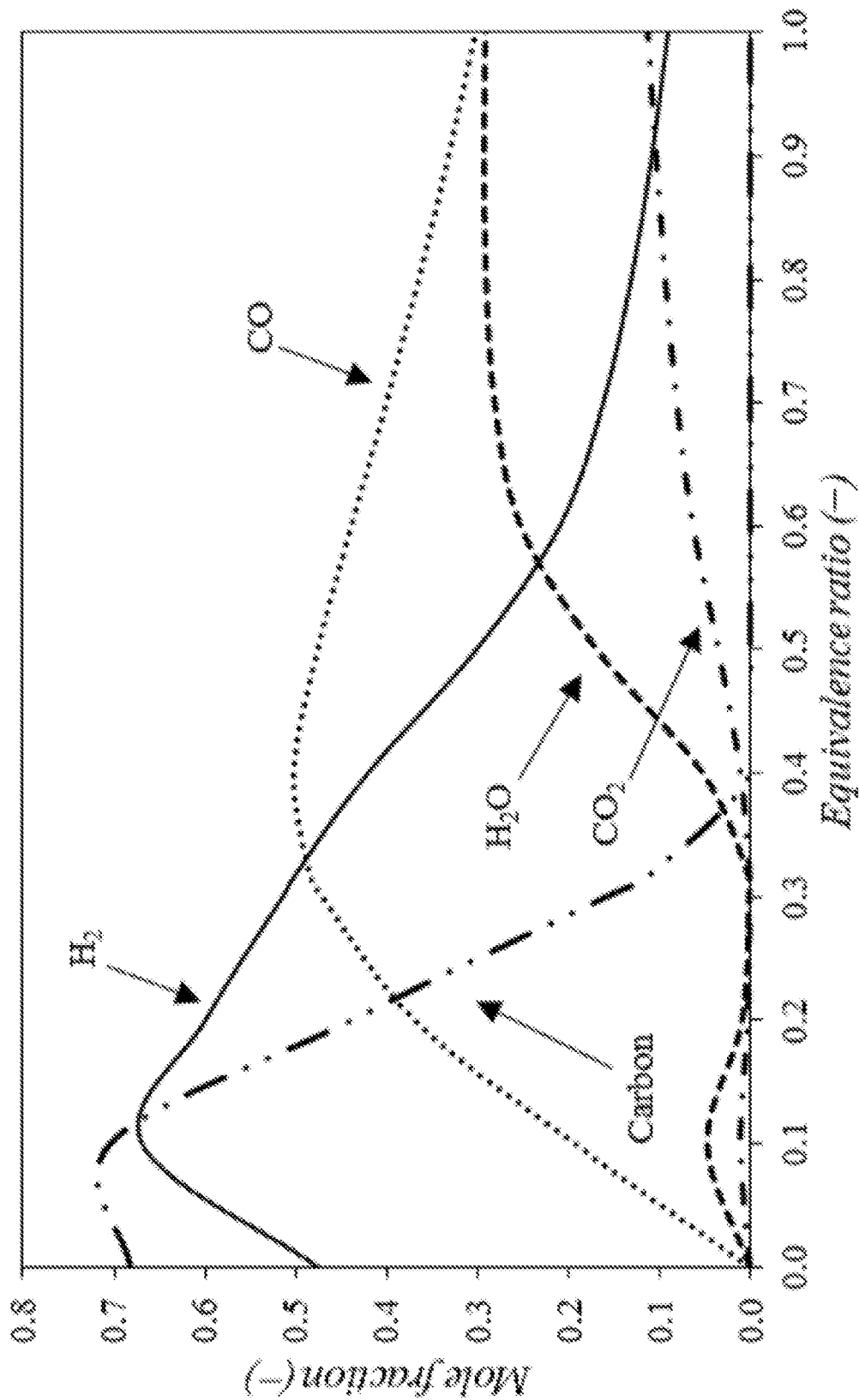
FIG. 2 shows an inventive process and the effect of the equivalence ratio on the product distribution of the producer gas.

FIG. 2 discloses model functions of the equivalence ratio for the gasification process using the layout in FIG. 1. The oxygen equivalence ratio can be an important parameter in the gasification. The equivalence ratio is defined as the ratio of actual oxygen to biomass weight ratio per stoichiometric oxygen to biomass weight ratio. The product distribution varies significantly with the increase of the oxygen equivalence ratio as shown in FIG. 2. High quality producer gas, i.e., low carbon formation and high concentration of $H_2$ and CO, can result from an oxygen equivalence ratio of 0.32, while optimum oxygen equivalence ratios in gasification may be in a range of from 0.26 to 0.43, 0.27 to 0.42, 0.28 to 0.40, 0.29 to 0.38, 0.30 to 0.36, or 0.31 to 0.34. An oxygen equivalence ratio of 0.32 and adiabatic conditions are assumed in the models herein. The high purity $O_2$ (95% $O_2$, 5% $N_2$) is injected to the gasifier (G) as the gasifying agent. Higher gasification temperature generally provides higher conversion of the fuel.

The oxidation reactor (OX) and the reduction reactor (RED) can be modelled using an $R_{Gibbs}$ reactor. A 20% excess of oxygen carrier materials (in this case, $Fe_2O_3$—$Fe_3O_4$) is circulated in the CLC to accomplish complete oxidation of the producer gas since incomplete conversion of hematite was experimentally observed at stoichiometric condition.

The heat recovery system exemplified in the modelling utilizes the exhaust of gas turbine generator (GT) and the gaseous product of reduction reactor (RED) to generate steam. The heat recovery system includes three steam generators, such as high pressure steam generator (HP-SG, 78.2 bar), medium pressure steam generator (MP-SG, 18.4 bar), and low pressure steam generator (LP-SG, 1.8 bar). Acceptable pressure ranges will of course vary based upon the equipment used, but exemplary ranges for the high pressure components could be in a range of from 150 to 50, 125 to 60, 100 to 65, or 90 to 70 bar. Likewise, exemplary ranges for the medium pressure components could be in a range of from 50 to 10, 40 to 12, 30 to 14, or 20 to 16 bar, and the exemplary ranges for the low pressure components could be in a range of from 10 to 1, 7.5 to 1.1, 5 to 1.2, 5 to 1.25, 2.5 to 1.4, or 2 to 1.5 bar. The temperature of the exhaust after heat recovery in the model is around 142° C. The exhaust may be in any temperature range, depending on the fluid driving the final turbine stage(s), e.g., 200 to 40, 180 to 50, 175 to 60, or 150 to 80° C., though the ubiquity of water as a turbine driving fluid will generally require a exhaust temperature above 100° C.

The power generation subsystem or "island," as modelled, comprises one gas turbine generator (GT) and three steam turbine generators, high pressure (ST-1), intermediate pressure (ST-2) and low pressure (ST-3), though there may be additional gas turbine generators and/or steam turbines within the scope of the invention. The gas turbine generator ordinarily generates power using hot gases/fluids from the oxidation reactor (OX), though the heating may be direct or indirect. The hot gases from the gas turbine (GT) outlet may be used to generate steam at three different pressures (in the example, 78.2 bar, 18.4 bar, and 1.8 bar) in the heat recovery system along with the hot gases from the reduction reactor (RED), or other fluids heated directly or indirectly elsewhere in the process. The steam may be fed to the steam turbine generators to generate power.

Figure 3:
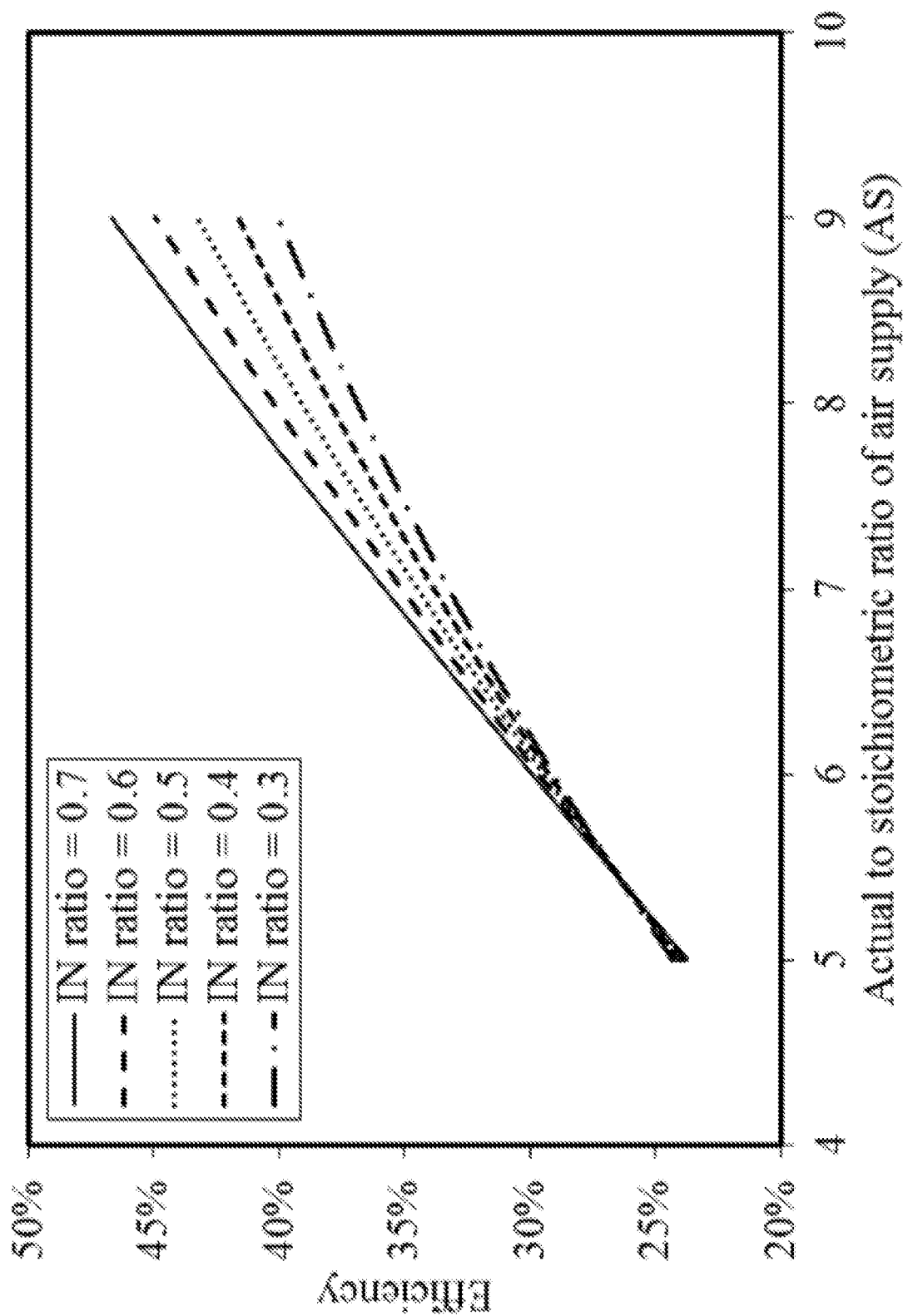
FIG. 3 shows an inventive process and the effect of the amount of the air supply on the efficiency of the combined CLC process at various inert ratios.

The effect of the air supply ratio and the inert ratio on the performance of the combined CLC process is modeled in FIG. 3. The actual to stoichiometric ratio of air supply (AS ratio) refers to moles of the actual air entering the process per stoichiometric moles of air necessary for complete combustion of the fuel. FIG. 3 shows that by varying the flow rate of air supply while keeping a constant flow rate of the fuel at various inert ratios. The inert ratio (IN ratio) is defined as the mass ratio of the inert material (e.g., $Al_2O_3$—exemplified herein, $SiO_2$, $ZrO_2$, etc.) to the mass of the oxygen carrier (i.e., $Fe_3O_4$—exemplified herein).

FIG. 3 illustrates that the efficiency of CLC processes within the scope of the invention significantly increases when the air supply ratio is augmented. For instance, at the inert ratio of 0.7, the efficiency increases from 23% to 47% when the air supply ratio is increased from 5 to 9. The efficiency increase may be caused by increased air supply enhancing the energy generation in the power generation subsystem, counteracting a slightly increased energy consumption by the air compressor, $CO_2$ compressors, and auxiliaries.

FIG. 3 also shows that the air supply ratio can effect the efficiency of the combined CLC process at varied inert ratios, i.e., ratios of the support mass to oxygen carrier mass. Higher inert ratios generally have a minor effect on the efficiency of the combined CLC process at low air supply ratios, while the effect is significant on the efficiency at high air supply ratios. A negative effect can be observed when the actual to stoichiometric ratio of air supply is lower than a certain value. For instance, at an air supply ratio of 5, the efficiency of the process depicted in FIG. 1 decreases from 24.31% to 23.85% when the inert ratio is increased from 0.3 to 0.7. A similar trend may occur using natural gas as the fuel and iron as the oxygen carrier. On the other hand, when the air supply ratio is 9 the efficiency of the integrated CLC process modelled, increases from 42% to 47% if the inert ratio is increased from 0.3 to 0.7.

It is believed that the inert material brings about this positive effect on efficiency by storing thermal energy. In other words, the inert material preserves the temperature of the CLC subsystem/island and consequently maintains the temperature of the thermodynamic cycle of the gas turbine. In addition, higher inert fractions promote higher fractions of the fuel heating value in the heat recovery system, particularly in heat recovery steam generators. The amount of the working fluid also has an effect on the performance of the gas turbine. When the air supply is limited, the role of the inert material is limited due to the insufficient amount of working fluid available to transfer the thermal energy from the CLC subsystem/island to the power generation subsystem/island. On the other hand, the presence of the inert material may contribute a positive effect if a sufficient air supply is injected to the CLC process.

Figure 4:
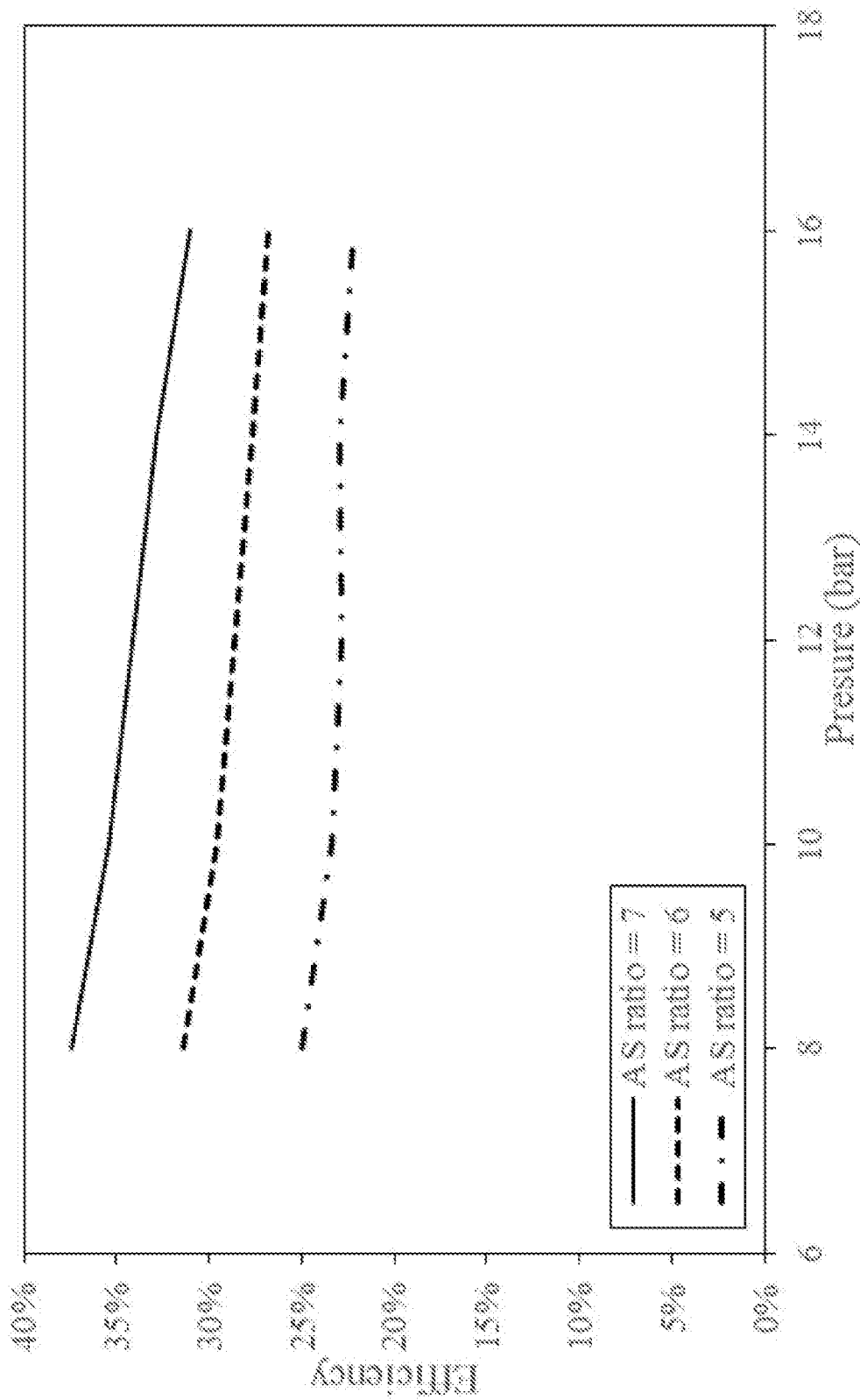
FIG. 4 shows the effect of the pressure on the efficiency of the combined CLC process at different air supply ratios.

FIG. 4 illustrates how an increase in the compression ratio, i.e., the pressure in the process, can negatively impact the efficiency of the process. At an air supply ratio of 7, the efficiency decreases from 37% to 31% as the compression ratio increases from 8 to 16 bar abs. Higher compression ratios of air, $CO_2$, and/or heavy oil, result in increased energy consumption. Thus, the total energy generated from the process decreases with increases in the compression ratio as reflected in FIGS. 4 and 5. A similar tendency is observable at an air supply ratio of 6 and 5. Efficiencies of integrated CLC processes may continuously decrease when pressure is elevated, for example, from 5 bar to 25 bar abs. At the same pressure, however, higher efficiencies of combined CLC process are observed as the air supply ratio is augmented, particularly, increased. This due to higher air supply ratios increasing the amount of the working fluid, which results in the increase of the turbine work.

Figure 5:
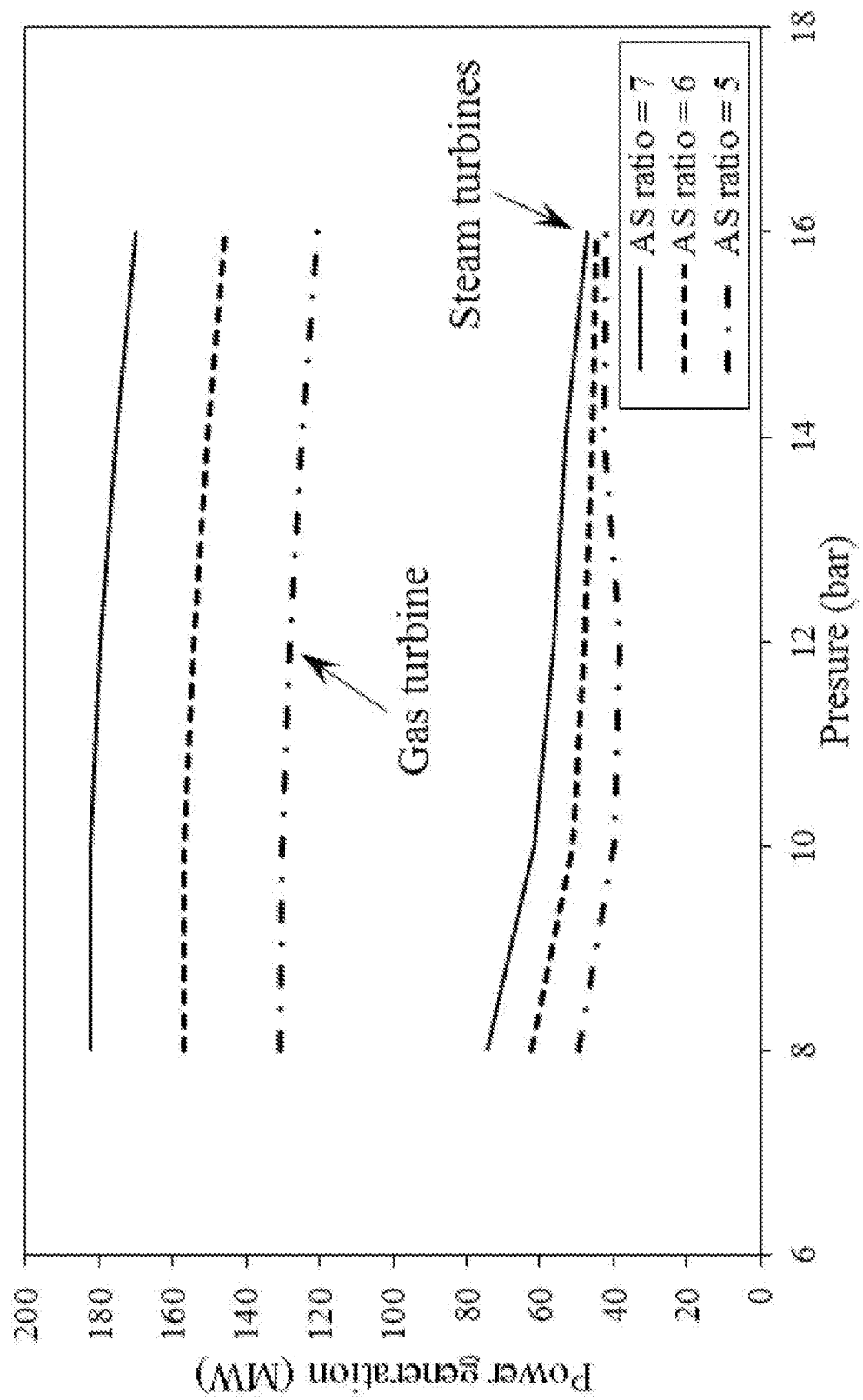
FIG. 5 shows an inventive process and the effect of the pressure on the power generated from the gas turbines and heat recovery-steam generators at different air supply ratios.

Power generation of the gas turbine declines if the compression ratio is increased from 8 bar to 16 bar abs as shown in FIG. 5. At the AS ratio of 7, the power generation of the gas turbine mitigates from 182 MW to 170 MW as the pressure increases from 8 bar to 16 bar abs. This is mainly due to air leakage and mechanical issues in the compressors and turbines. Thus, the higher pressures intensify the effect of the losses on the performance of the compressor and turbine. Under certain circumstances integrated CLC processes (cooling, heating, and power generation) can exhibit the highest power generation at 10 bar abs.

FIG. 5 illustrates the influence of pressure to the power generation of the steam turbines. Power generation of the steam turbines declines with increased pressure. For instance, 74 MW of power can be generated at an air supply ratio of 7 and 8 bar abs pressure. However, power generation may decrease to 47 MW at a pressure of 16 bar abs with the same air supply ratio. The HRSG may generate energy from both the exhaust gas from the gas turbine (GT) and the flue gas from the oxidation reactor (OX). The flue gas from the oxidation reactor (OX) is influenced by the quality of the producer gas, i.e., syngas, from the gasification. The producer gas quality, in terms of the heating value—reflecting the composition of the combustible gases (CO and $H_2$), declines when the pressure is increased.

Figure 6:
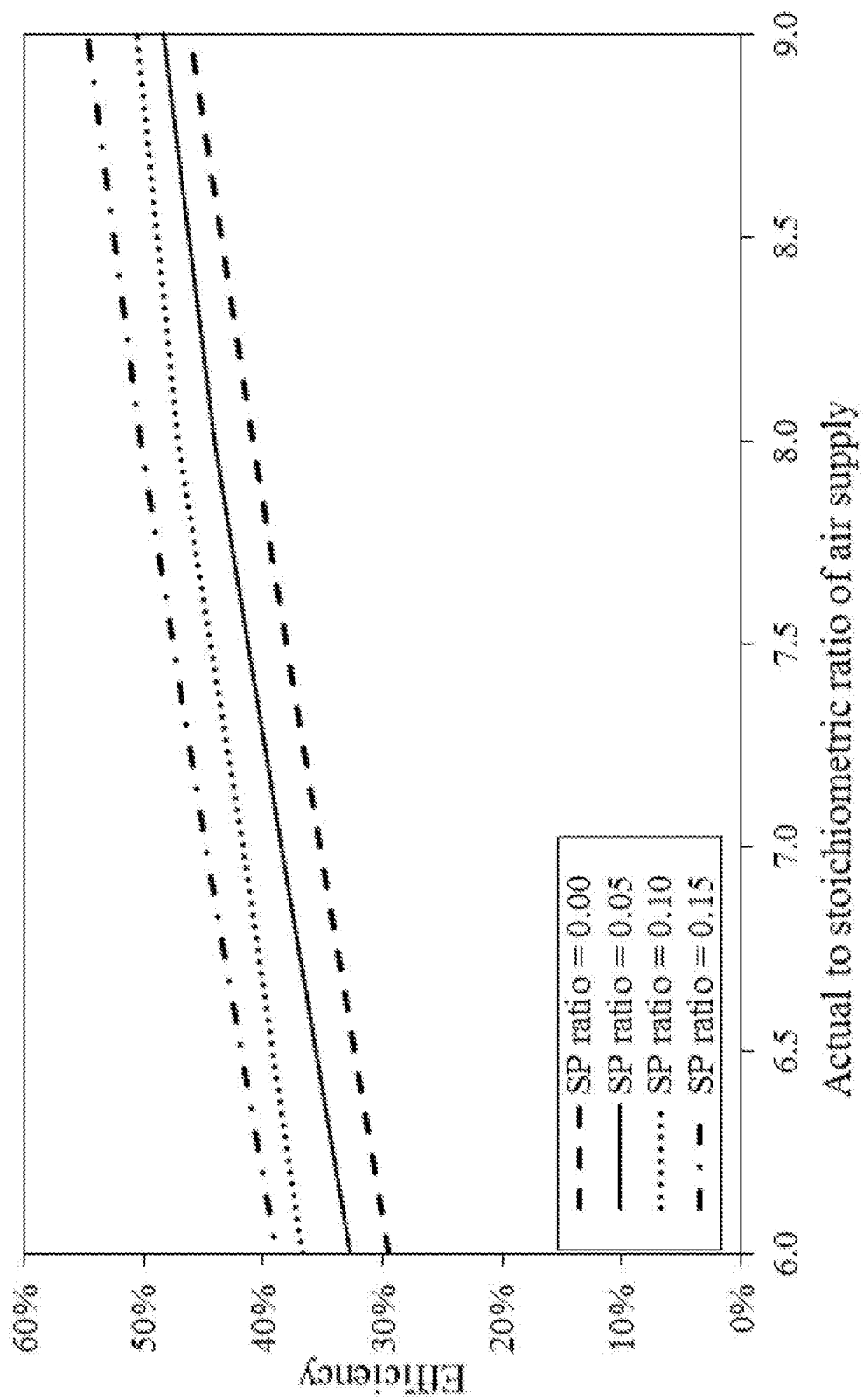
FIG. 6 shows an inventive process and the effect of the air supply ratio on the efficiency of the integrated CLC process at different split ratios of the producer gas.

FIG. 6 illustrates that the efficiency of the integrated CLC process can increase by increasing the split ratio. The splitting or split ratio of the producer gas refers to the moles of producer gas directly flowing to the combustor (CMB) per mole of the producer gas from the gasification. For instance, at an air supply ratio of 9, the efficiency of the combined CLC process in the model increases from 46% to 55% as the split ratio is increased from 0 to 0.15. This result can be explained by noting that splitting the producer gas to the combustor (CMB) allows the temperature of the gas entering the gas turbine (GT) to be higher than the temperature of the CLC subsystem. In other words, the gas turbine (GT) may have the capability to fully extract the energy from the split producer gas and thus operate independently from the CLC subsystem.

A useful feature of the integrated CLC process can be to minimize $CO_2$ emissions. Accordingly, increased process efficiency can be balanced against the $CO_2$ emitted to the atmosphere. From a $CO_2$ emissions standpoint, the performance of integrated CLC processes and plants can be described in terms of the specific $CO_2$ emission. Specific $CO_2$ emission refers to the mass of the $CO_2$ emitted to the atmosphere per the quantity of the energy generated from the process.

Figure 7:
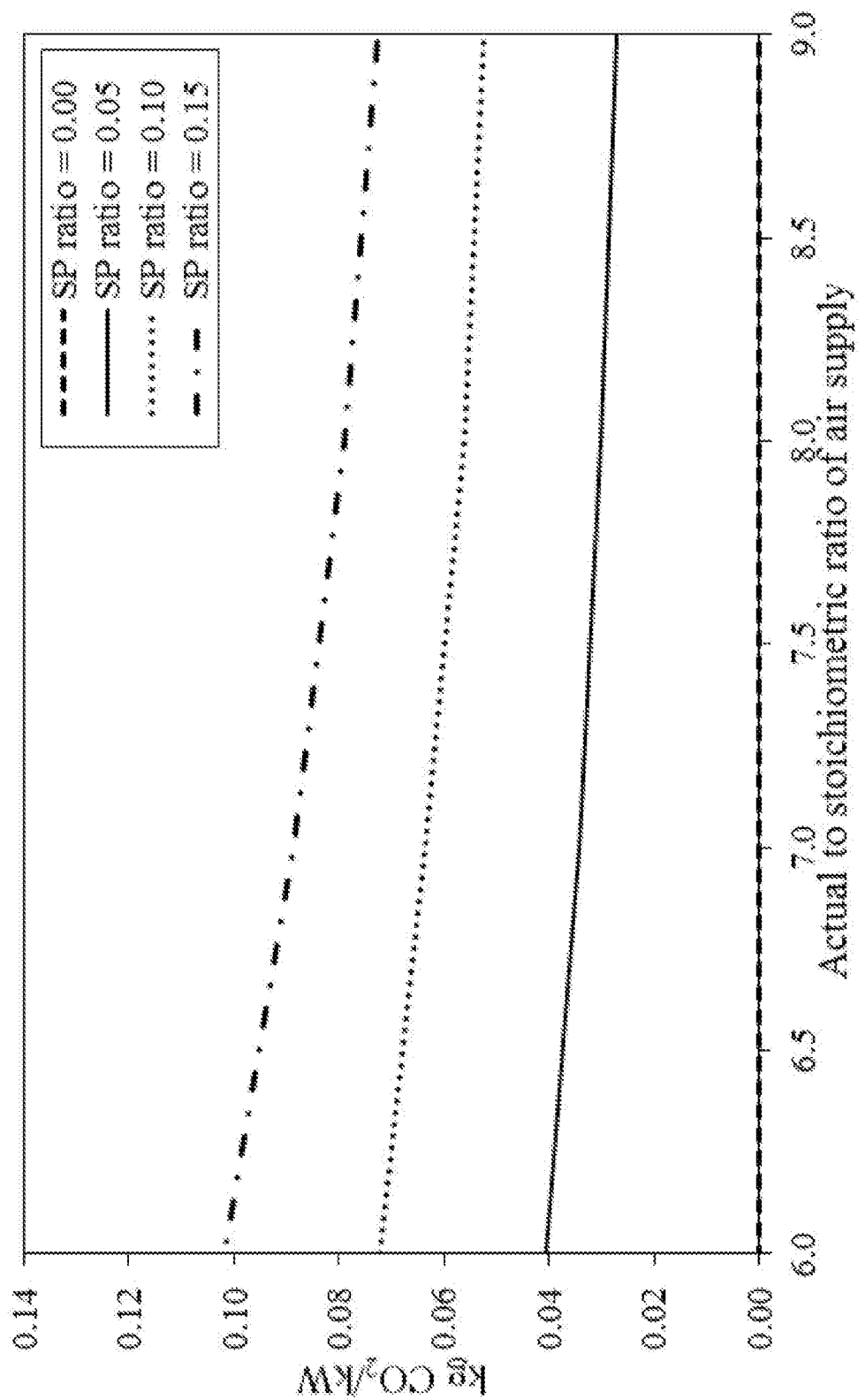
FIG. 7 shows an inventive process and the effect of the air supply ratio on the specific $CO_2$ emission at different split ratios of the producer gas.
Figure 8:
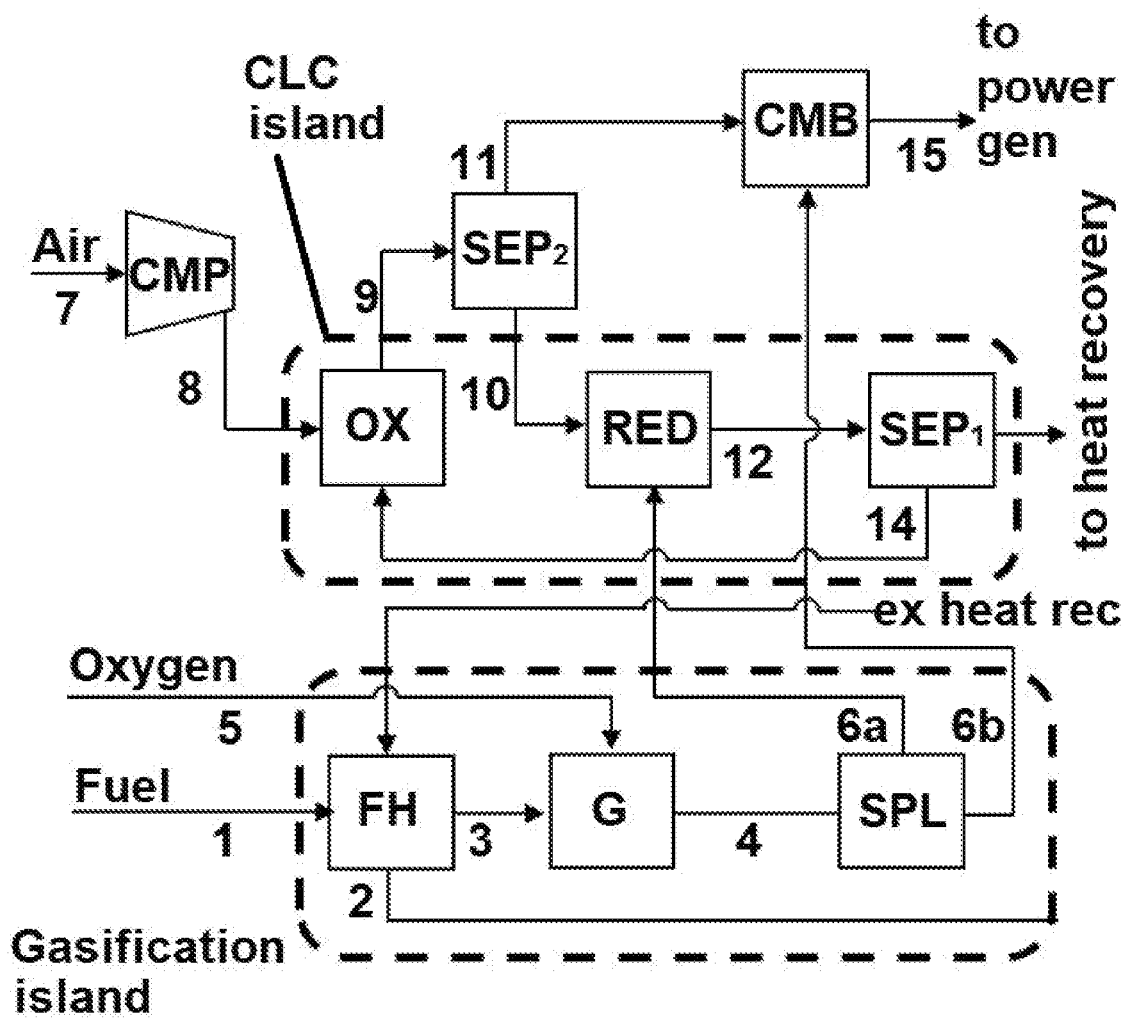
FIG. 8 shows the gasification and CLC subsystems of the schematic plant layout of FIG. 1.

FIG. 7 illustrates that a higher split ratio can have an adverse effect on $CO_2$ emission. For instance, at the air supply ratio of 9, the specific $CO_2$ emission increases from 0 to 0.073 kg $CO_2$/kW when the split ratio is increased from 0 to 0.15. Direct injection of the producer gas to the combustor (CMB) and release of $CO_2$ to the atmosphere may explain this effect. Injecting the natural gas to the combustor can likewise produce higher specific $CO_2$ emission. FIG. 7 shows that increased air supply ratio can mitigate the specific $CO_2$ emission if the producer gas is split to the combustor (CMB). For example, at a split ratio of 0.15, the modelled specific $CO_2$ emission declines from 0.102 kg/$CO_2$ to 0.073 kg/$CO_2$ as the air supply ratio increases from 6 to 9. A higher increase in power generation than the increase in the $CO_2$ emission, as the air supply ratio increases, can explain this phenomenon.

Thus, at higher air supply ratios, higher inert ratios can have a positive effect on the efficiency, e.g., as modelled, 47% at air supply ratio of 9 and inert ratio of 0.7. However, increasing the pressure can adversely affect the performance of the integrated CLC process. For example, a efficiency decline from 37% to 31% is observed in the model when the pressure is increased from 8 to 16 bar abs. Increasing the split ratio of the producer gas into the combustor (CMB) can also have a positive effect on the overall efficiency, e.g., 55% at air supply ratio of 9 and inert ratio of 0.7, though a negative effect is observed on specific $CO_2$ emission, i.e., 0.073 kg $CO_2$/kW at the same air supply ratio of 9 and inert ratio of 0.7.

Obviously, numerous modifications and variations of the present invention are possible in light of the above teachings. It is therefore to be understood that within the scope of the appended claims, the invention may be practiced otherwise than as specifically described herein.

REFERENCE SYMBOLS 1-36 streams
FH fuel heater
G gasifier
SPL gas splitter
CMP compressor
OX oxidation reactor
RED reduction reactor
SEP gas-solid separator
CMB combustor
GT gas turbine
HP high pressure
MP medium pressure
LP low pressure
SG steam generator
ST-1 first steam turbine
ST-2 second steam turbine
ST-3 third steam turbine
CND condenser
C-1 first stage intercooler gas compressor
C-2 second stage intercooler gas compressor

The invention claimed is:

1. An integrated system, comprising:
a gasification subsystem comprising (a-i) a fuel heater suitable for heating a liquid fuel stream, (a-ii) a gasifier located downstream of, and fluidly connected to, the fuel heater, the gasifier being configured to gasify the liquid fuel stream with an oxygen-rich stream to form a syngas stream, and (a-iii) a gas splitter located downstream of, and fluidly connected to, the gasifier, the gas splitter being configured to split the syngas stream into a first syngas substream and a second syngas substream;
a chemical looping combustion (CLC) subsystem comprising (b-i) a reducer located downstream of, and fluidly connected to, the gas splitter, the reducer being configured to oxidize the first syngas substream in the presence of an oxygen carrier to form a $CO_2/H_2O$ stream, the oxygen carrier being reduced to a reduced oxygen carrier, and (b-ii) an oxidizer located downstream of, and fluidly connected to, a first solid-gas separator, the oxidizer being configured to oxidize the reduced oxygen carrier in the presence of an oxygen-containing stream to regenerate the oxygen carrier;
a power generation subsystem comprising (c-i) a combustor located downstream of, and fluidly connected to, the gas splitter and the oxidizer, the combustor combusting the second syngas substream in the presence of the oxygen-containing stream to form an exhaust stream, and (c-ii) a first gas turbine located downstream of, and fluidly connected to, the combustor for generating gas turbine shaft work with the exhaust stream;
a heat recovery-steam generation (HRSG) subsystem comprising (d-i) a first heat exchanger located downstream of, and fluidly connected to, the reducer, the first heat exchanger being configured to form steam by heating a water stream with the $CO_2/H_2O$ stream.

2. The system of claim 1, wherein the CLC subsystem further comprises (b-iii) a first solid-gas separator located downstream of, and fluidly connected to, the reducer, the first solid-gas separator being configured to separate the $CO_2/H_2O$ stream from the reduced oxygen carrier,
wherein the first heat exchanger is located downstream of, and fluidly connected to, the first solid-gas separator.

3. The system of claim 1, wherein the CLC subsystem further comprises (b-iv) a second solid-gas separator located downstream of, and fluidly connected to, the oxidizer, the second solid-gas separator being configured to separate the oxygen-containing stream from the oxygen carrier,
wherein the combustor is located downstream of, and fluidly connected to, the second solid-gas separator.

4. The system of claim 2, wherein the CLC subsystem further comprises (b-iv) a second solid-gas separator located downstream of, and fluidly connected to, the oxidizer, the second solid-gas separator being configured to separate the oxygen-containing stream from the oxygen carrier,
wherein the combustor is located downstream of, and fluidly connected to, the second solid-gas separator.

5. The system of claim 1, wherein the power generation subsystem further comprises
(c-iii) a first steam turbine located downstream of, and fluidly connected to, the first heat exchanger,
wherein the first steam turbine is configured to generate steam turbine shaft work with the steam.

6. The system of claim 1, wherein the HRSG subsystem further comprises (d-ii) a second heat exchanger located downstream of, and fluidly connected to, the reducer and the first heat exchanger,
wherein the second heat exchanger is configured to form steam at no higher temperature than the first heat exchanger by heating a water stream with the $CO_2/H_2O$ stream.

7. The system of claim 6, wherein the power generation subsystem further comprises (c-iv) a second steam turbine located downstream of, and fluidly connected to, the second heat exchanger,
wherein the second steam turbine operates at no higher pressure than the first steam turbine, and
wherein the second steam turbine is configured to generate steam turbine shaft work with the steam.

8. The system of claim 6, wherein the HRSG subsystem further comprises (d-iii) a third heat exchanger located downstream of, and fluidly connected to, the reducer and the first and second heat exchangers,
wherein the third heat exchanger is configured to form steam at no higher temperature than the second heat exchanger by heating a water stream with the $CO_2/H_2O$ stream.

9. The system of claim 8, wherein the power generation subsystem further comprises (c-v) a third steam turbine located downstream of, and fluidly connected to, the third heat exchanger,
wherein the third steam turbine operates at no higher pressure than the second steam turbine, and
wherein the third steam turbine is configured to generate steam turbine shaft work with the steam.

10. The system of claim 8, wherein the heat exchangers are arranged in series.

11. The system of claim 7, wherein the steam turbines are arranged in series.

12. The system of claim 1, further comprising:
a condenser located downstream of, and fluidly connected to, the first heat exchanger, the condenser condensing the $CO_2/H_2O$ stream to form a condensate and a $CO_2$ stream; and a gas compressor located downstream of, and fluidly connected to, the condenser, the gas compressor being configured to compress the $CO_2$ stream, wherein $CO_2$ is present in the $CO_2$ stream at a volume concentration of at least 75 vol % relative to the total volume of the $CO_2$ stream.

13. The system of claim 8, further comprising:

two or more condensers located downstream of, and fluidly connected to, the first heat exchanger, the condensers condensing the $CO_2/H_2O$ stream to form a condensate and a $CO_2$ stream; and a gas compressor located downstream of, and fluidly connected to, each of the condensers, wherein the gas compressors are configured to compress the $CO_2$ stream, wherein $CO_2$ is present in the $CO_2$ stream at a volume concentration of at least 75 vol % relative to the total volume of the $CO_2$ stream.

14. The system of claim 1, wherein the oxygen carrier comprises iron oxide, nickel oxide, manganese oxide, copper oxide, cobalt oxide, or a mixture of two more of any of these, and/or wherein the oxygen carrier is supported on a substantially inert material comprising aluminum oxide, silica, a silicate, a zeolite, sepiolite, titanium oxide, zirconium oxide, or a mixture of two or more of any of these.

15. The system of claim 1, wherein the oxygen carrier comprises iron (III) oxide supported on alumina, with a mass ratio of the alumina to the oxygen carrier in a range of from 0.25 to 0.75.

16. The system of claim 1, configured such that a molar ratio of the second syngas substream to the syngas stream is in a range of from 0.001 to 0.25.

17. The system of claim 1, wherein the fuel heater is further suitable for heating and delivering a solid fuel stream.

18. The system of claim 1, further comprising a water-gas shift reactor stage downstream of the gas splitter and/or a pressure swing absorber.

19. A method of generating power using the integrated system of claim 1, the method comprising:

delivering the liquid fuel stream to the fuel heater to form a heated fuel stream;

delivering the heated fuel stream to the gasifier to form the syngas stream in the presence of the oxygen-rich stream;

splitting the syngas stream to the first syngas substream and the second syngas substream with the gas splitter, and delivering the first syngas substream to the reducer while concurrently delivering the second syngas stream to the combustor;

oxidizing the first syngas stream with the reducer in the presence of the oxygen carrier to form the $CO_2/H_2O$ stream, wherein the oxygen carrier is reduced to the reduced oxygen carrier;

optionally separating the $CO_2/H_2O$ stream from the reduced oxygen carrier with the first solid-gas separator, before delivering the reduced oxygen carrier to the oxidizer;

oxidizing the reduced oxygen carrier with the oxidizer in the presence of the oxygen-containing stream to regenerate the oxygen carrier;

optionally separating the oxygen-containing stream from the oxygen carrier with a second solid-gas separator, before delivering the oxygen carrier to the oxidizer while concurrently delivering the oxygen-containing stream to the combustor;

combusting the second syngas stream in the presence of the oxygen-containing stream to form the exhaust stream; and delivering the exhaust stream to the first gas turbine to generate power.

20. The method of claim 19, wherein the oxygen carrier is iron (III) oxide supported on alumina, with a mass ratio of the alumina to the oxygen carrier in a range of from 0.25 to 0.75, and wherein a molar ratio of the second syngas substream to the syngas stream is 0.01 to 0.25.

\* \* \* \* \*